(12) United States Patent
Fujihara et al.

(10) Patent No.: US 8,577,503 B2
(45) Date of Patent: Nov. 5, 2013

(54) APPARATUS FOR TREATING FUEL AND METHOD OF STARTING THE SAME

(75) Inventors: Seiji Fujihara, Osaka (JP); Yukimune Kani, Osaka (JP); Hidenobu Wakita, Kyoto (JP); Kunihiro Ukai, Nara (JP)

(73) Assignee: Panasonic Corporation, Osaka (JP)

(*) Notice: Subject to any disclaimer, the term of this patent is extended or adjusted under 35 U.S.C. 154(b) by 854 days.

(21) Appl. No.: 12/740,794

(22) PCT Filed: Nov. 11, 2008

(86) PCT No.: PCT/JP2008/003263
§ 371 (c)(1),
(2), (4) Date: Apr. 30, 2010

(87) PCT Pub. No.: WO2009/063616
PCT Pub. Date: May 22, 2009

(65) Prior Publication Data
US 2010/0266909 A1 Oct. 21, 2010

(30) Foreign Application Priority Data
Nov. 13, 2007 (JP) .................................. 2007-294751
Nov. 13, 2007 (JP) .................................. 2007-294752

(51) Int. Cl.
*G05B 15/00* (2006.01)
*B01J 8/00* (2006.01)

(52) U.S. Cl.
USPC .......... 700/274; 700/266; 422/625; 422/626; 422/631; 422/638; 422/643; 48/127.7; 48/127.9; 48/197 R

(58) Field of Classification Search
USPC ......... 422/643, 625, 626, 638, 631; 48/127.9, 48/127.7, 197 R, 204; 700/266, 274
See application file for complete search history.

(56) References Cited

U.S. PATENT DOCUMENTS

| 6,793,027 | B1* | 9/2004 | Yamada et al. ............. 180/65.1 |
| 8,178,062 | B2* | 5/2012 | Fuju et al. .................... 422/643 |
| 2003/0154655 | A1* | 8/2003 | Chintawar et al. .......... 48/198.3 |
| 2005/0129997 | A1* | 6/2005 | Maenishi et al. ............. 429/20 |
| 2007/0154750 | A1* | 7/2007 | Ukai et al. .................... 429/19 |

FOREIGN PATENT DOCUMENTS

| JP | 2002-075426 | 3/2002 |
| JP | 2002-093447 | 3/2002 |
| JP | 2004-185941 | 7/2004 |
| JP | 2004-288387 | 10/2004 |
| JP | 2007-210835 | 8/2007 |
| JP | 2008-010369 | 1/2008 |
| JP | 2008-156154 | 7/2008 |
| WO | 2007/091632 A1 | 8/2007 |

OTHER PUBLICATIONS

Search Report for corresponding International Application No. PCT/JP2008/003263 mailed Feb. 24, 2009.

* cited by examiner

*Primary Examiner* — Nina Bhat
(74) *Attorney, Agent, or Firm* — Renner, Otto, Boisselle & Sklar, LLP

(57) ABSTRACT

A fuel processing apparatus includes a reformer, raw material supply section, moisture supply section, heating section, reforming temperature detection section, shift converter, shift temperature detection section, and control section. When the apparatus is booted, the control section activates the raw material supply section to begin supplying a raw material to the reformer, and activates the heating section to begin supplying heat to the reforming catalyst. Thereafter, when the reforming temperature detection section detects a temperature equal to or greater than a reforming water supply reference temperature, the control section operates the moisture supply section to supply moisture to the reformer, and while the reforming temperature detection section detects a temperature equal to or greater than the reforming water supply reference temperature, determines an amount of moisture to be supplied to the reformer and controls the moisture supply section, based on the temperature detected by the shift temperature detection section.

18 Claims, 12 Drawing Sheets

APPARATUS FOR TREATING FUEL AND METHOD OF STARTING THE SAME

TECHNICAL FIELD

The present invention relates to a fuel processing apparatus for generating hydrogen-containing gas through a reforming reaction between a raw material and steam, and a booting method thereof.

BACKGROUND ART

Hydrogen-containing gas is often used as an anode gas which is the fuel gas in power generation by a fuel cell power generation system, and it is generally the case that a fuel processing apparatus for generating hydrogen-containing gas by using a steam reforming technique is installed together with the fuel cell.

A fuel processing apparatus which utilizes the steam reforming technique includes a reformer for generating hydrogen-containing gas by causing a steam reforming reaction and a heating section for supplying the heat which is necessary for that steam reforming reaction. The reformer contains a reforming catalyst, e.g., a precious metal type catalyst such as platinum, ruthenium, or rhodium, or a Ni type catalyst. To this reformer, a hydrocarbon-type raw material such as natural gas, LPG, naphtha, gasoline, or kerosene, or an alcohol-type raw material such as methanol, and water are supplied. Then, when the reformer is heated by the heating section to a temperature which is suitable for the steam reforming reaction, hydrogen-containing gas is generated by the action of the reforming catalyst.

In this steam reforming reaction, about 10 to 15% (dry gas basis) of carbon monoxide (hereinafter denoted as CO) is generated as a secondary component. CO poisons the catalyst which is used for the electrodes of the fuel cell, thus lowering the power generation ability. Therefore, in the fuel processing apparatus, a shift converter and/or a CO remover are also installed in order to reduce the CO concentration in the hydrogen-containing gas. The shift converter contains a shift catalyst for allowing CO to react with steam, thus causing a shift into hydrogen and carbon dioxide. As the shift catalyst, a precious metal type catalyst such as platinum, ruthenium, and rhodium, a Cu—Zn type catalyst, an Fe—Cr type catalyst, or the like is used, for example. Moreover, the shift converter is controlled to a temperature which is suitable for the shift reaction (shift reaction temperature), and in many cases, reduces the CO concentration in the reforming gas to about 0.5% or less.

On the other hand, the CO remover contains a selective oxidation catalyst for oxidizing the CO within the reforming gas. As the selective oxidation catalyst, a precious metal type catalyst such as platinum, ruthenium, and rhodium, or the like is used. The CO remover causes an oxidation reaction of CO by using the air which is supplied to its interior, thus lowering the CO concentration within the reforming gas to 100 ppm, and preferably to 10 ppm or less.

In order to use a fuel cell power generation system in a general household and obtain a high energy efficiently, it is desirable to boot or stop the fuel cell power generation system in accordance with the electric power load and heat load in the household. However, in order to generate hydrogen-containing gas, it is necessary to warm the reformer, the shift converter, and the CO remover to an appropriate temperature (this being referred to as a boot of the fuel processing apparatus), and thus the boot of the fuel processing apparatus requires a certain amount of time. At the boot of the fuel processing apparatus, first, the reforming catalyst in the reformer is heated by the heating section. At this time, the raw material and water are allowed to pass through the reforming catalyst, thus conveying the heat of the heating section to the shift converter to also increase the temperature of the shift catalyst. At this time, a method of directly heating the shift catalyst by using a heating structure such as an electric heater may be adopted. However, from the standpoint of reducing the number of parts and realizing a low cost, a method of heating the shift catalyst by supplying the raw material and water from the reforming catalyst to the shift catalyst, without installing an electric heater, is useful.

However, if water is supplied when the temperature of the shift catalyst is low, the water may condense on the shift catalyst. For example, in the case where a Cu—Zn type catalyst is used as the shift catalyst, the condensed water oxidizes and deteriorates the catalyst, and therefore a method of supplying water after a sufficient increase in the temperature of the shift catalyst is generally adopted.

Moreover, in order to prevent steam condensation and oxidation of the reforming catalyst, Patent Document 1 proposes a method of monitoring the temperature of the reforming catalyst, and supplying a gas which is selected from among air, combustion exhaust, steam, raw material gas, and nitrogen in accordance with the temperature of the reforming catalyst.

Patent Document 1: Japanese Laid-Open Patent Publication No. 2002-93447

DISCLOSURE OF INVENTION

Problems to be Solved by the Invention

In the booting method which supplies water after a sufficient increase in the temperature of the shift catalyst, only the raw material is passed through the shift converter until the temperature of the shift catalyst is sufficiently increased (initial stage of booting). This results in a smaller heat quantity being taken out of the shift converter than in the case of supplying the raw material and water at the initial stage of booting. Thus, a prolonged time is required for increasing the temperature of the shift catalyst, resulting in a problem of an increased boot time.

Furthermore, when the temperature of the reforming catalyst is increased while only allowing the raw material to pass through the reforming catalyst, a problem also occurs in that carbon may deposit due to pyrolysis of the raw material, etc., thus deteriorating the characteristics of the catalyst.

On the other hand, in the booting method which monitors the temperature of the reforming catalyst for starting gas supply as in Patent Document 1, the temperature of the reforming catalyst must be kept within a predetermined range while each gas is being supplied, which results in a problem of prolonged boot time.

As described above, in the aforementioned conventional methods, trying to reduce the boot time of a fuel processing apparatus results in the problem of deteriorated characteristics of the catalysts, i.e., the reforming catalyst and the shift catalyst, and reduction in boot time and retention of catalyst characteristics have not been reconciled.

The present invention has been made in order to solve the aforementioned problems. An objective thereof is to provide: a fuel processing apparatus which can suppress deterioration in characteristics of catalysts used in the fuel processing apparatus, especially a shift catalyst, while reducing the boot time of the fuel processing apparatus; and a booting method thereof.

Means for Solving the Problems

A first fuel processing apparatus according to the present invention is a fuel processing apparatus comprising: a reformer having a reforming catalyst for causing a reforming reaction between a raw material and moisture to generate a hydrogen-containing gas; a raw material supply section for supplying the raw material to the reformer; a moisture supply section for supplying the moisture to the reformer; a heating section for supplying a heat which is necessary for the reforming reaction to at least the reforming catalyst; a reforming temperature detection section provided for the reformer to detect a temperature of the reforming catalyst; a shift converter being connected to the reformer and having a shift catalyst for causing a shift reaction between moisture and CO in the hydrogen-containing gas; a shift temperature detection section provided for the shift converter to detect a temperature of the shift catalyst; and a control section, wherein, when the apparatus is booted, the control section activates the raw material supply section to begin supplying the raw material to the reformer, and activates the heating section to begin supplying the heat to the reforming catalyst, and thereafter, when the reforming temperature detection section detects a temperature equal to or greater than a reforming water supply reference temperature, operates the moisture supply section to supply the moisture to the reformer, and while the reforming temperature detection section detects a temperature equal to or greater than the reforming water supply reference temperature, detects an amount of the moisture to be supplied to the reformer and controls the moisture supply section, based on the temperature detected by the shift temperature detection section.

In one embodiment, the reforming water supply reference temperature is a temperature of the reforming catalyst such that carbon deposition at the reforming catalyst goes beyond a tolerable range.

In one embodiment, when the temperature detected by the shift temperature detection section reaches a shift reference temperature, the control section controls the moisture supply section to increase the amount of moisture to be supplied to the reformer; and the shift reference temperature is a temperature of the shift catalyst such that condensation of water at the shift catalyst falls within a tolerable range.

In one embodiment, wherein, before beginning to supply the moisture, the control section determines whether the temperature detected by the shift temperature detection section has reached the shift reference temperature or not; if it is determined that the temperature detected by the shift temperature detection section has not reached the shift reference temperature, the control section controls the moisture supply section to supply a first amount of moisture to the reformer until the temperature detected by the shift temperature detection section reaches the shift reference temperature, and supply a second amount of moisture which is greater than the first amount to the reformer when the temperature detected by the shift temperature detection section reaches the shift reference temperature.

In one embodiment, if it is determined that the temperature detected by the shift temperature detection section has reached the shift reference temperature, the control section controls the moisture supply section to supply the second amount of moisture to the reformer since the beginning of supply of the moisture.

A second fuel processing apparatus according to the present invention is a fuel processing apparatus comprising: a reformer having a reforming catalyst for causing a reforming reaction between a raw material and moisture to generate a hydrogen-containing gas; a raw material supply section for supplying the raw material to the reformer; a moisture supply section for supplying the moisture to the reformer; a heating section for supplying a heat which is necessary for the reforming reaction to at least the reforming catalyst; a reforming temperature detection section provided for the reformer to detect a temperature of the reforming catalyst; a shift converter being connected to the reformer and having a shift catalyst for causing a shift reaction between moisture and carbon monoxide in the hydrogen-containing gas; a shift temperature detection section provided for the shift converter to detect a temperature of the shift catalyst; and a control section, wherein, when the apparatus is booted, the control section activates the raw material supply section to begin supplying the raw material to the reformer, and activates the heating section to begin supplying the heat to the reforming catalyst, and thereafter, operates the moisture supply section to begin supplying the moisture to the reformer, and until the temperature detected by the shift temperature detection section reaches a shift reference temperature, controls the heating section so that the temperature detected by the reforming temperature detection section is equal to or less than a reforming reaction reference temperature; and the shift reference temperature is a temperature of the shift catalyst such that condensation of water at the shift temperature detection section falls within a tolerable range, and the reforming reaction reference temperature is a temperature of the reforming catalyst such that a carbon dioxide concentration in the hydrogen-containing gas discharged from the reformer is equal to or less than a reference level.

In one embodiment, if the temperature detected by the shift temperature detection section reaches the shift reference temperature, the control section controls the heating section so that the temperature detected by the reforming temperature detection section is a reforming operation temperature which is higher than the reforming reaction reference temperature.

In one embodiment, if the temperature detected by the reforming temperature detection section becomes equal to or greater than the reforming water supply reference temperature, the control section causes the reformer to begin supplying moisture; and the reforming water supply reference temperature is a temperature such that carbon deposition at the reforming catalyst goes beyond a tolerable range.

In one embodiment, the reforming catalyst contains Ni.

In one embodiment, the shift catalyst contains Cu and Zn.

A first booting method for a fuel processing apparatus according to the present invention is a booting method for a fuel processing apparatus including: a reformer having a reforming catalyst for causing a reforming reaction between a raw material and moisture to generate a hydrogen-containing gas; a raw material supply section for supplying the raw material to the reformer; a moisture supply section for supplying the moisture to the reformer; a heating section for supplying a heat which is necessary for the reforming reaction to at least the reforming catalyst; a reforming temperature detection section provided for the reformer to detect a temperature of the reforming catalyst; a shift converter being connected to the reformer and having a shift catalyst for causing a shift reaction between moisture and carbon monoxide in the hydrogen-containing gas; and a shift temperature detection section provided for the shift converter to detect a temperature of the shift catalyst, the booting method comprising: step (a) of activating the raw material supply section to begin supplying the raw material to the reformer; step (b) of activating the heating section to begin supplying the heat to the reforming catalyst; step (c) of, after step (a) and step (b), if the reforming temperature detection section detects a temperature equal to or greater than a reforming water supply reference temperature, operating the moisture supply section to supply moisture to the reformer, wherein, at step (c), based on the temperature detected by the shift temperature detection section, an amount of moisture to be supplied to the reformer is determined, and the moisture supply section is controlled.

In one embodiment, the reforming water supply reference temperature is a temperature of the reforming catalyst such that carbon deposition at the reforming catalyst goes beyond a tolerable range.

In one embodiment, at step (c), if the temperature detected by the shift temperature detection section reaches the shift reference temperature, the amount of moisture to be supplied to the reformer is increased, and the shift reference temperature is a temperature of the shift catalyst such that condensation of water at the shift temperature detection section falls within a tolerable range.

In one embodiment, before step (c), step (d) of determining whether the temperature detected by the shift temperature detection section has reached the shift reference temperature or not is further comprised, wherein, if it is determined at step (d) that the temperature detected by the shift temperature detection section has not reached the shift reference temperature, the moisture supply section is controlled to begin supplying a first amount of moisture to the reformer at step (c) and supply a second amount of moisture which is greater than the first amount to the reformer when the temperature detected by the shift temperature detection section reaches the shift reference temperature; and if it is determined at step (d) that the temperature detected by the shift temperature detection section has reached the shift reference temperature, the moisture supply section is controlled to begin supplying the second amount of moisture to the reformer at step (c).

A second booting method for a fuel processing apparatus according to the present invention is a booting method for a fuel processing apparatus including: a reformer having a reforming catalyst for causing a reforming reaction between a raw material and moisture to generate a hydrogen-containing gas; a raw material supply section for supplying the raw material to the reformer; a moisture supply section for supplying the moisture to the reformer; a heating section for supplying a heat which is necessary for the reforming reaction to at least the reforming catalyst; a reforming temperature detection section provided for the reformer to detect a temperature of the reforming catalyst; a shift converter being connected to the reformer and having a shift catalyst for causing a shift reaction between moisture and carbon monoxide in the hydrogen-containing gas; and a shift temperature detection section provided for the shift converter to detect a temperature of the shift catalyst, the booting method comprising: step (a) of activating the raw material supply section to begin supplying the raw material to the reformer; step (b) of activating the heating section to begin supplying the heat to the reforming catalyst; step (c) of, after step (a) and step (b), operating the moisture supply section to begin supplying the moisture to the reformer; and after step (c), controlling the heating section so that the temperature detected by the reforming temperature detection section is equal to or less than a reforming reaction reference temperature until the temperature detected by the shift temperature detection section reaches a shift reference temperature, wherein, the shift reference temperature is a temperature of the shift catalyst such that condensation of water at the shift temperature detection section falls within a tolerable range; and the reforming reaction reference temperature is a temperature of the reforming catalyst such that a carbon dioxide concentration in the hydrogen-containing gas discharged from the reformer is equal to or less than a reference level.

In one embodiment, after step (c), the heating section is controlled so that the temperature detected by the reforming temperature detection section is a reforming operation temperature which is higher than the reforming reaction reference temperature if the temperature detected by the shift temperature detection section reaches the shift reference temperature.

In one embodiment, at step (c), if the temperature detected by the reforming temperature detection section becomes equal to or greater than the reforming water supply reference temperature, the reformer is caused to begin supplying moisture; and the reforming water supply reference temperature is a temperature of the reforming catalyst such that carbon deposition at the reforming catalyst goes beyond a tolerable range.

EFFECTS OF THE INVENTION

In accordance with a fuel processing apparatus of the present invention and a booting method thereof, after the temperature of the reforming catalyst reaches the reforming water supply reference temperature, not only the raw material but also water is supplied to the reformer, whereby carbon deposition at the reformer can be suppressed. Moreover, as compared to the case where only the raw material is supplied to the reformer, the heat quantity to be supplied to the shift converter and the CO remover is increased, thus making it possible to shorten the boot time.

Furthermore, when the temperature of the shift catalyst is lower than the shift reference temperature so that water may condense on the shift catalyst, a smaller amount of water is supplied than during the normal driving. This makes it possible to reduce the amount of carbon dioxide generated by the reformer, and also reduce the amount of water condensing at the shift converter. As a result, deterioration in the characteristics of the shift catalyst can be suppressed. On the other hand, if the temperature of the shift catalyst becomes equal to or greater than the shift reference temperature, the same amount of water as that in the normal driving is supplied, so that the gas flow rate of the hydrogen-containing gas from the reformer increases, and the shift converter and the CO remover can be heated more quickly. Therefore, the boot time can be shortened.

Furthermore, after the reforming catalyst reaches the reforming reaction reference temperature and until the shift catalyst reaches the shift reference temperature, the heating section is controlled so that the temperature of the reforming catalyst does not exceed the reforming reaction reference temperature. Since this makes it possible to keep the amount of carbon dioxide generated in the reformer small when there is a fear of water condensation in the shift converter, deterioration of the shift catalyst can be suppressed.

Figure 1:
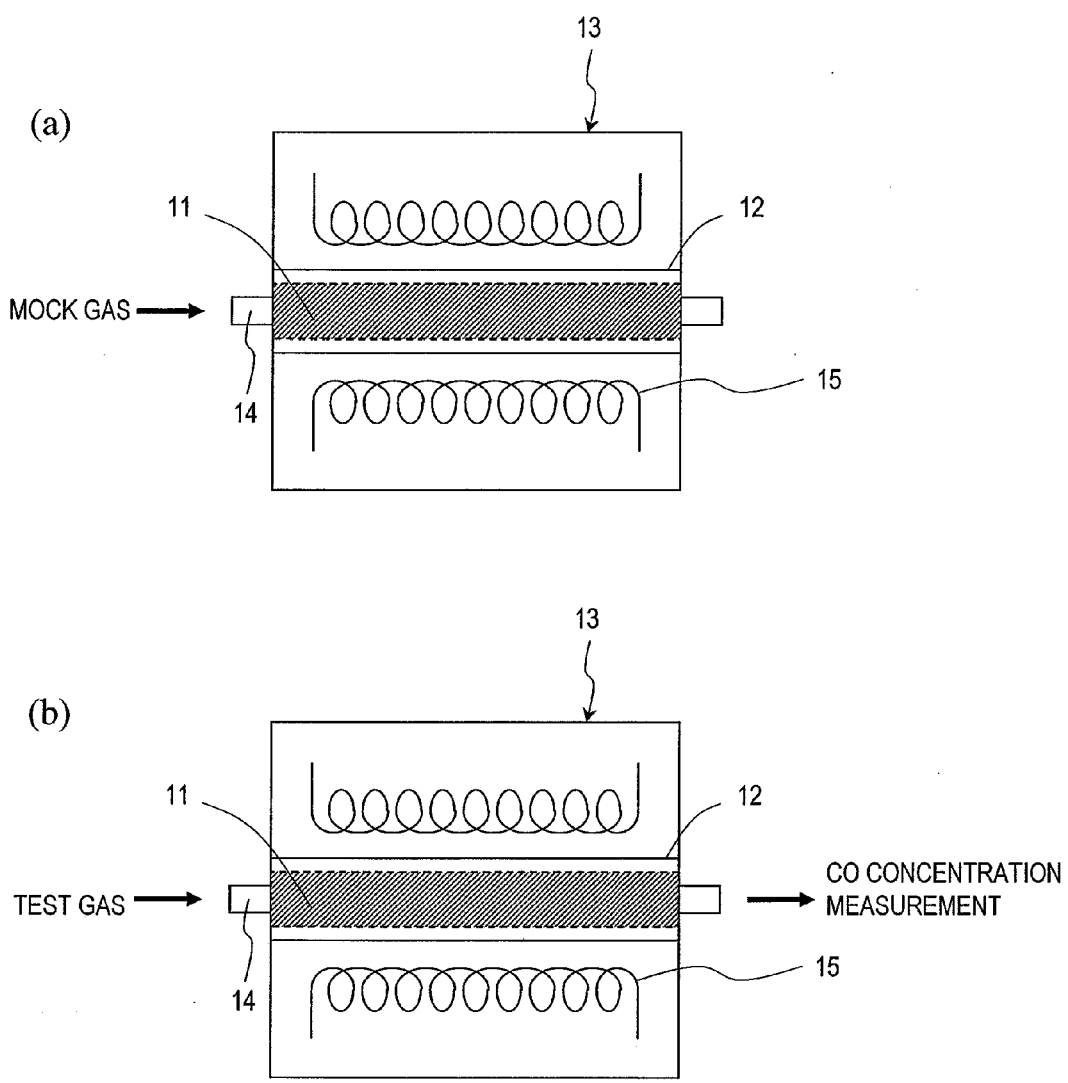
FIGS. 1(a) and (b) are schematic diagrams illustrating steps of a test which was conducted in order to study causes of deterioration in a shift catalyst.

DESCRIPTION OF REFERENCE NUMERALS 11 shift catalyst
12 reaction tube
13 electric furnace
14 pipe
15 nichrome line
100 fuel processing apparatus
111 reformer
112 raw material supply section
113 raw material supply path
114 water supply section
115 water supply path
116 heating section
117 reforming temperature detector
121 shift converter
122 shift heating section
123 shift temperature detector
131 CO remover
141 pipe
142 supply pipe
143 switching section
200 control section

BEST MODE FOR CARRYING OUT THE INVENTION

The inventors have studied the causes of deterioration of a shift catalyst. As a result, it was found that, when a Cu—Zn type catalyst is used as the shift catalyst, in particular, the deterioration of the shift catalyst is promoted if condensed water and carbon dioxide (hereinafter denoted as $CO_2$) coexist. Hereinafter, examples of the studied condition and the results will be described.

FIGS. 1(a) and (b) are schematic diagrams showing the steps of a test which was conducted in order to study the causes of deterioration of a shift catalyst. First, as shown in FIG. 1(a), a reaction tube 12 accommodating a shift catalyst 11 was placed in an electric furnace (fixed bed flow reactor) 13, and subjected to a boot stop test. Gas was supplied through a pipe 14, and the electric furnace 13 was heated by a nichrome line 15. The temperature of the shift catalyst 11 was measured with a thermocouple (not shown). By adjusting the heating of the electric furnace 13 based on the measured temperature, the catalyst temperature was controlled. Since this fixed bed flow reactor is a device which is commonly used for the characteristics evaluation of catalysts, and the detailed description thereof is omitted.

As for the specific conditions of the boot stop test, about 20 ml of a Cu—Zn type shift catalyst (MDC-7 manufactured by Sud-Chemie) 11 was charged in the reaction tube 12, thus preparing four samples NO. 1 to NO. 4. First, the shift catalyst 11 was subjected to a generally known, recommended reduction treatment. In sample NO. 1, the temperature of the shift catalyst 11 at which to begin supplying a mock gas was set to 100° C., instead of room temperature, so that the steam within the mock gas would not condense at the shift catalyst 11. Next, assuming a boot of a fuel processing apparatus, in samples NO. 2 to NO. 4, a mock gas which was assumed to be the hydrogen-containing gas to be supplied from a reformer was supplied from when the temperature of the shift catalyst 11 was about room temperature, and the temperature of the shift catalyst 11 was increased under the condition of 10° C./min. In other words, NO. 1 was produced as a sample not containing condensed water, and NO. 2 to NO. 4 were produced as samples containing condensed water. Among samples NO. 2 to NO. 4, the values of the temperature of the reforming catalyst and the ratio (hereinafter denoted as S/C) of steam (a molar amount of $H_2O$ molecules in the flow amount of water per unit time)/carbon (a molar amount of C atoms in the flow amount of raw material per unit time) were differentiated, thus ensuring that respectively different amounts of $CO_2$ were supplied.

The mock gas composition differed depending on the composition of the raw material supplied, S/C, and the temperature of the reforming catalyst. The mock gas composition was determined by calculating a gas equilibrium based on the composition of the raw material supplied, S/C, and the temperature of the reforming catalyst. In the boot stop tests for samples NO. 1 to NO. 4, methane gas was supplied at a flow rate of 1 NmL/min as the raw material. Table 1 shows the conditions for each of samples NO. 1 to NO. 4. As shown in Table 1, in sample NO. 2, the temperature of the reforming catalyst was assumed to be 650° C., and S/C to be 3. As a result of calculating a gas equilibrium based on these values, in sample NO. 2, the amount of $CO_2$ to be supplied from the reformer was about 0.5 NmL/min. In sample NO. 3, the temperature of the reforming catalyst was assumed to be 350° C., and S/C to be 3. In sample NO. 3, the amount of $CO_2$ to be supplied from the reformer was about 0.2 NmL/min. In sample NO. 4, the temperature of the reforming catalyst was assumed to be 350° C., and S/C to be 1. In sample NO. 4, the amount of $CO_2$ to be supplied from the reformer was about 0.1 NmL/min.

TABLE 1

| | reformer temperature (° C.) | S/C | condensed water at shift converter | $CO_2$ (NmL/min) |
| --- | --- | --- | --- | --- |
| sample No. 1 | 650 | 3 | NO | — |
| sample No. 2 | 650 | 3 | YES | 0.5 |
| sample No. 3 | 350 | 3 | YES | 0.2 |
| sample No. 4 | 350 | 1 | YES | 0.1 |

Note that, instead of supplying a mock gas, a reforming catalyst may be charged in a reaction tube (not shown) of a fixed bed flow reactor to actually generate hydrogen-containing gas, which may be supplied to the reaction tube 12 having the shift catalyst 11.

When the temperature of the shift catalyst 11 was increased until the catalyst temperature reached 250° C., a shift reaction was performed for 60 minutes, and thereafter supply of the mock gas was stopped. Then, assuming a purge with the raw material, methane gas was passed under the condition of 10 NmL/min to cool the shift catalyst, and after it was sufficiently cooled down to room temperature, supply of methane gas was stopped. This series of operations mocks stopping of a boot of a fuel processing apparatus, thus constituting a boot stop test. For samples NO. 1 to NO. 4, ten boot stop tests were repeated.

After the boot stop tests were performed, as shown in FIG. 1(*b*), the aforementioned fixed bed flow reactor was used. In this reactor, samples NO. 1 to NO. 4 were heated from room temperature, the electric furnace being controlled so that the catalyst temperature was 170° C. (lowest temperature of the shift catalyst when a fuel processing apparatus is driven). A test gas was supplied such that hydrogen was 56%, CO was 7%, $CO_2$ was 7%, and steam was 30%. In this state, the CO concentration at the outlet of the reaction tube 12 was measured by gas chromatography. Before the boot stop tests as shown in FIG. 1(*a*), the CO concentration at the outlet of the reaction tube 12 had been measured in advance, with respect to each of samples NO. 1 to NO. 4. Then, deterioration in the characteristics of the shift catalyst was evaluated from a reduction in CO concentration after the boot stop tests relative to the CO concentration before the boot stop tests (relative activity). Note that the detailed descriptions of gas chromatography and the operating conditions thereof are omitted because they pertain to the measurement of the composition of hydrogen-containing gas in any generic fuel reforming device.

Figure 2:
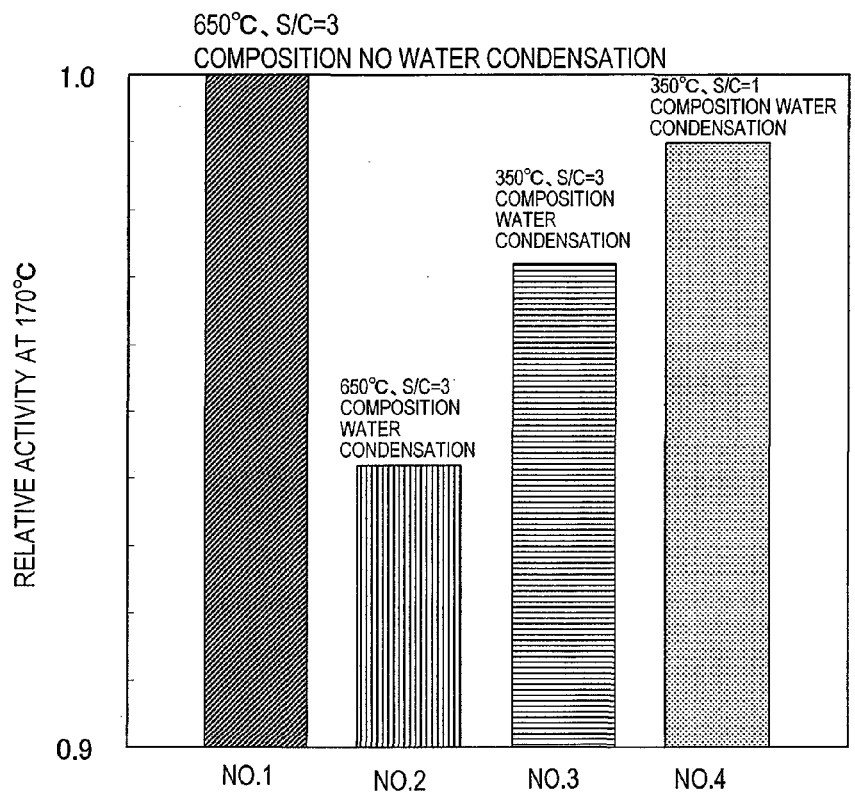
FIG. 2 A comparison diagram of relative activity when ten boot stop tests were repeated, where the composition of a gas to be supplied (mock gas composition) was varied, such that the initial characteristics before the boot stop tests were 1.

FIG. 2 shows results of evaluating deterioration in the characteristics of the shift catalyst, with respect to samples NO. 1 to NO. 4. The method of calculating the values shown in FIG. 2 will be described by using specific values. Assuming that 0.05 L of CO is measured at the outlet of the reaction tube 12 when e.g. 1 L of CO is supplied to the reaction tube 12 in the measurement before the boot stop tests, it can be calculated that the undeteriorated shift catalyst 11 has caused a shift reaction of 0.95 L of CO. On the other hand, assuming that 0.1 L of CO is measured at the outlet of the reaction tube 12 when 1 L of CO is supplied to the reaction tube 12 in the measurement after the boot stop tests, it can be calculated that the shift catalyst 11 has caused a shift reaction of 0.9 liters of CO. Each value shown in FIG. 2 is a value obtained by dividing the amount (0.9 L) of CO which the deteriorated shift catalyst 11 has caused a shift reaction of, by the amount (0.95 liters) of CO which the undeteriorated and initial shift catalyst has caused a shift reaction of.

As shown in FIG. 2, the relative activity of NO. 1 is approximately one, and the amount of CO which the shift catalyst 11 has caused a shift reaction of is almost the same before and after the boot stop tests. This indicates that there is hardly any deterioration in the characteristics of the shift catalyst. On the other hand, the characteristics of NO. 2 are greatly deteriorated. Since the catalyst temperature and S/C are identical between NO. 1 and NO. 2, this difference in their results is ascribable to condensation of water at the shift catalyst of NO. 2. However, in NO. 3, deterioration in the characteristics is suppressed as compared to NO. 2; and deterioration in the characteristics is even more suppressed in NO. 4. Since the catalyst is wetted with water due to water condensation under the conditions of each of NO. 2 to NO. 4, it is conceivable that, other than the catalyst being oxidized by the condensed water to cause deterioration in the characteristics, there are also factors causing deterioration in characteristics.

When the reforming temperature is high and S/C is also high, the steam reforming reaction of the raw material progresses so that a large amount of hydrogen is generated and also an increased amount of $CO_2$ is generated. Taking this into consideration, it is presumable that the differences in the level of deterioration in characteristics are based on the $CO_2$ amount in the mock gas. As shown in Table 1, the generated amount of $CO_2$ decreases from NO. 2 to NO. 3 to NO. 4. Therefore, it can be seen that the greater the $CO_2$ amount in the hydrogen-containing gas is, the more deteriorated the characteristics of the shift catalyst are. In other words, it can be seen that, when a Cu—Zn type catalyst is used as the shift catalyst, the deterioration of the shift catalyst is promoted under the coexistence of condensed water and $CO_2$, and a greater level of deterioration occurs as there is a greater amount of $CO_2$. This indicates that, if the shift catalyst has a low temperature at boot, it is desirable to elevate the temperature under conditions such that the generated amount of $CO_2$ is as small as possible.

Under the conditions of NO. 4, which suffers from little deterioration in characteristics, the generated amount of $CO_2$ for 1 mol of methane is 0.1 mols. By taking this into account, it is desirable that the upper limit of the $CO_2$ generated amount is an amount such that 10% of the carbon atoms in the methane molecules changes into $CO_2$ (an amount such that 10% or less of the carbon component in the raw material becomes $CO_2$).

Hereinafter, Embodiments which are based on the aforementioned study results will be described with reference to the drawings.

(Embodiment 1)

<Construction of the Fuel Processing Apparatus 100>

Figure 3:
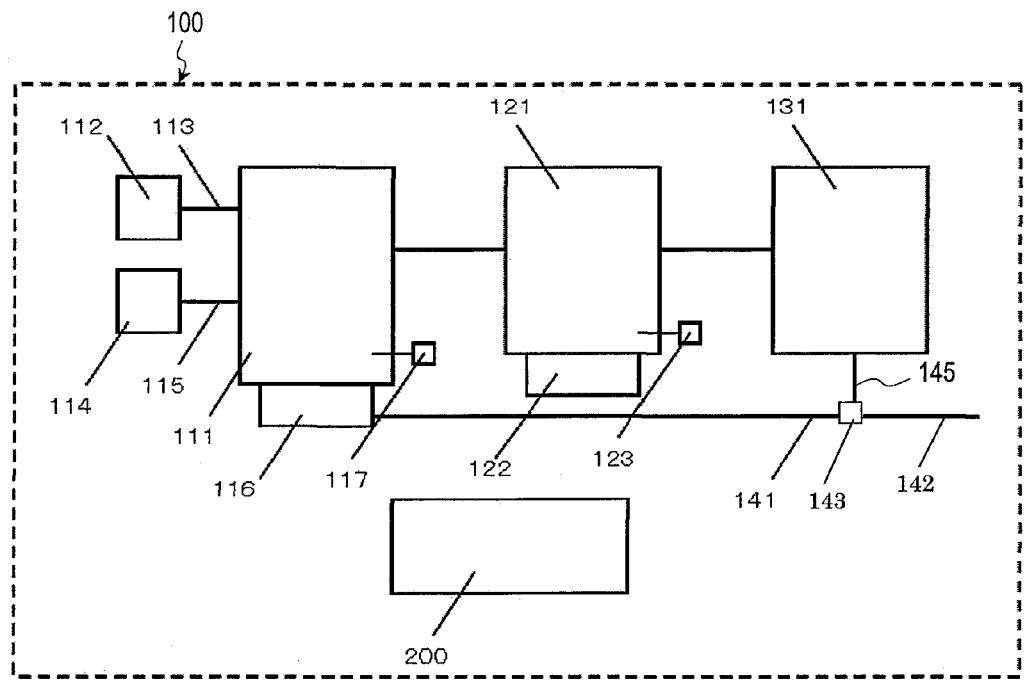
FIG. 3 A schematic structural diagram showing Embodiment 1 of a fuel processing apparatus according to the present invention.

FIG. 3 is a schematic structural diagram showing Embodiment 1 of a fuel processing apparatus according to the present invention.

As shown in FIG. 3, the fuel processing apparatus 100 of the present embodiment includes a reformer 111 having a reforming catalyst for causing a reforming reaction between a raw material and moisture to generate hydrogen-containing gas. Also included are a shift converter 121 which is connected to the reformer 111 and has a shift catalyst for causing a shift reaction between moisture and CO in the hydrogen-containing gas, and a CO remover 131 which is connected to the shift converter 121 and oxidizes CO in the hydrogen-containing gas. The shift converter 121 reduces the CO concentration in the hydrogen-containing gas through a shift reaction. After a small amount of air is added, the hydrogen-containing gas from the shift converter 121 is supplied to the CO remover 131. Through oxidation of CO, the CO remover 131 further reduces the CO concentration in the hydrogen-containing gas.

To the reformer 111, a raw material supply section 112 which retains a raw material for a steam reforming reaction is connected. The raw material supply section 112 includes a booster pump (not shown) for boosting the pressure of the raw material, and the raw material is supplied from the raw material supply section 112 to the reformer 111 via a raw material supply path 113. A moisture supply section 114 which retains moisture for a steam reforming reaction is also connected to the reformer 111. The moisture supply section 114 includes a water pump, and moisture is supplied from the moisture supply section 114 to the reformer 111 via a moisture supply path 115. A heating section 116 for supplying the heat which is necessary for a reforming reaction to the reforming catalyst and a reforming temperature detector 117 for detecting the temperature of the reforming catalyst are provided for the reformer 111.

The shift converter 121 is provided downstream of the reformer 111 along the direction in which the hydrogen-containing gas flows. A shift heating section 122, which is an electric heater provided on the shift converter 121 for heating the shift catalyst, and a shift temperature detector 123 for detecting the temperature of the shift catalyst are provided for the shift converter 121.

The CO remover 131 is provided downstream of the shift converter 121 along the direction in which the hydrogen-containing gas flows. The CO remover 131 is connected to a pipe 141 and a supply pipe 142, via a pipe 145 and a switching section 143. The pipe 141 is connected to the heating section 116 of the reformer 111, whereas the pipe 142 is connected to the exterior of the fuel processing apparatus (e.g., a fuel cell). The hydrogen-containing gas which is sent out from the CO remover 131 is supplied to the heating section 116 via the pipe 141 when the fuel processing apparatus 100 is booted. On the other hand, during the normal operation after the boot of the fuel processing apparatus 100 is completed, the hydrogen-containing gas from the CO remover 131 is supplied to the fuel cell or the like (not shown in detail) via the supply pipe 142. During the normal operation, by the actions of the shift converter 121 and the CO remover 131, the CO concentration in the hydrogen-containing gas from the CO remover 131 is reduced to about 10 ppm or less. Note that, the above-described operation of the fuel processing apparatus 100 is conducted based on instructions from the control section 200.

The control section 200 is implemented as a computer such as a microcomputer. The control section 200 has the function of controlling the operations of the raw material supply section 112, the water supply section 114, the heating section 116, the shift heating section 122, and the like, based on the temperature information of the reforming temperature detector 117 and the shift temperature detector 123, and controls the driving state of the fuel processing apparatus 100. Note that the control section 200 does not need to be a single control section, but may be a group of control sections such that a plurality of control sections cooperate to perform control. In this case, a plurality of control sections may be provided in the control section 200 in a dispersed manner, and they may cooperate to control the operation of the fuel processing apparatus 100.

In the present embodiment, infrastructure lines of town gas are used as a supply system, and 13A gas which is supplied therefrom is used as the raw material. Other than 13A, a hydrocarbon type raw material such as natural gas, LPG, naphtha, gasoline, or kerosene, or an alcohol type raw material such as methanol may be used.

Moreover, as the reforming catalyst to be mounted in the reformer 111, a ruthenium (Ru) type catalyst may be used. Otherwise, a precious metal type catalyst such as platinum (Pt) or rhodium (Rh), or a nickel (Ni) type catalyst may also be used as the reforming catalyst. Although only a copper (Cu)-zinc (Zn) type catalyst is used as a shift catalyst to be mounted in the shift converter 121, a precious metal type catalyst such as Pt, Ru, or Rh, an iron (Fe)-chromium (Cr) type catalyst, and a copper (Cu)-zinc (Zn) type catalyst may be concurrently used as the shift catalyst. As the selective oxidation catalyst to be mounted in the CO remover 131, a ruthenium (Ru) type catalyst can be used. Otherwise, a Pt type catalyst or Pt—Ru type catalyst can also be used as the selective oxidation catalyst.

The heating section 116 is constructed so as to include a burner for combusting a combustible gas such as the raw material and the hydrogen-containing gas, an ignition device, and an airing device such as a fan or a pump for supplying oxidation gas such as air (not shown in detail). The conditions for supplying heat to the reformer 111 are adjusted in such a manner that heating to a temperature which is suitable for a steam reforming reaction (reforming reaction temperature) is realized by adjusting the supplied amount of combustible gas.

<Operation of the Fuel Processing Apparatus 100>

Figure 4:
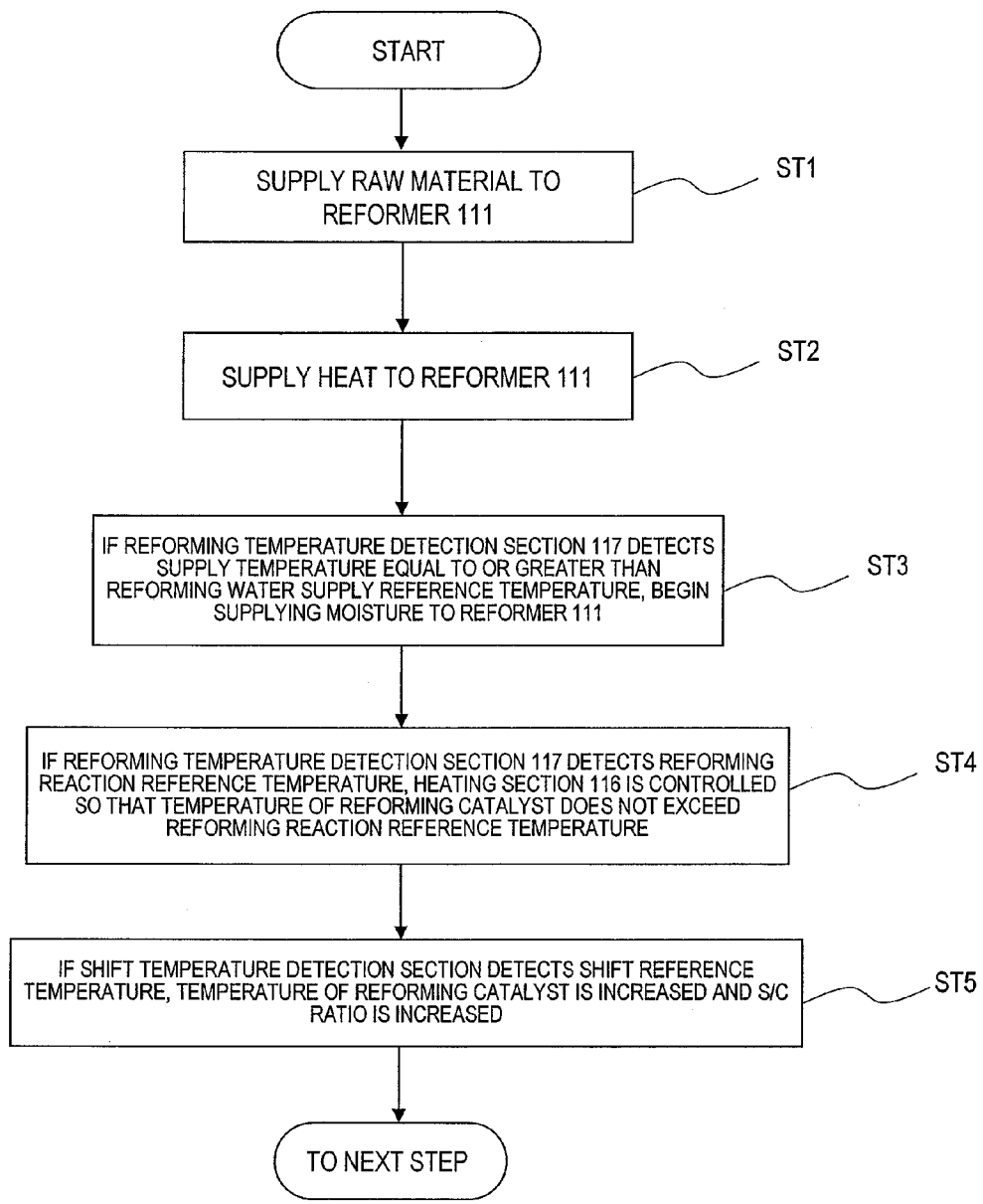
FIG. 4 A flowchart showing a boot operation of the fuel processing apparatus of Embodiment 1.
Figure 5:
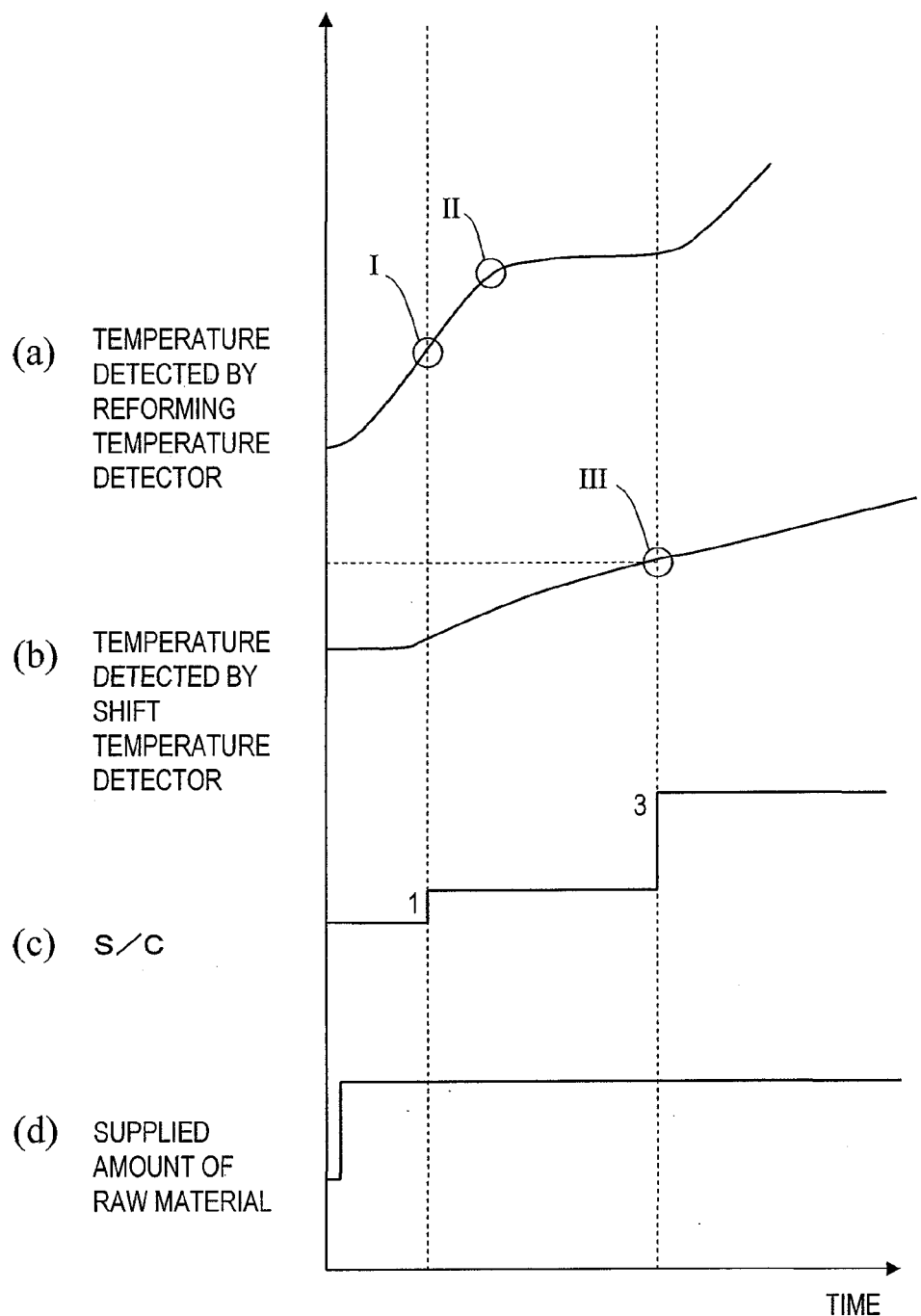
FIG. 5 A timing chart showing temperature of a reforming catalyst, temperature of a shift catalyst, S/C, and supplied amount of raw material.

Next, a boot operation of the fuel processing apparatus 100 of the present embodiment will be described with reference to FIG. 4 and FIG. 5. FIG. 4 is a flowchart showing a boot operation of the fuel processing apparatus of Embodiment 1. FIG. 5 is a timing chart showing temperature of a reforming catalyst, temperature of a shift catalyst, S/C, and supplied amount of raw material.

As shown in FIG. 4, in the present embodiment, when the fuel processing apparatus is booted, first, the raw material supply section 112 is activated at step ST1 to begin supplying the raw material from the raw material supply section 112 to the reformer 111. At this point in time on, as shown in FIG. 5(d), a certain amount of raw material is supplied to the reformer 111. The raw material passes through the reformer 111, the shift converter 121, the CO remover 131, the pipe 145, and the pipe 141, so as to be supplied to the heating section 116. Note that, at this point in time, moisture is not being supplied from the moisture supply section 114 to the reformer 111, so that no steam reforming reaction occurs. Therefore, by conveying the raw material which is supplied to the reformer 111 over to the heating section 116 and allowing it to combust, an efficient use of the raw material can be attained.

Next, at step ST2, the heating section 116 is activated, with the aforementioned raw material as a fuel. The heating section 116 heats the reformer 111 by supplying heat to the reforming catalyst. As a result, as shown in FIG. 5(a), the temperature detected by the reforming temperature detector 117, i.e., the temperature of the reforming catalyst, begins to increase. When the reformer 111 is heated, the heat is also conveyed to the shift converter 121 because of the raw material passing through the reformer 111, so that the shift converter 121 also begins to be heated. As a result, as shown in FIG. 5(b), the temperature detected by the shift temperature detector 123, i.e., the temperature of the shift catalyst, also begins to increase.

Next, at step ST3, if the reforming temperature detector 117 detects a temperature which is equal to or greater than a reforming water supply reference temperature (temperature I shown in FIG. 5(a); typically 200° C.), the moisture supply section 114 is operated so as to supply moisture to the reformer 111. The S/C at this time may be 1, for example. The reforming water supply reference temperature is a temperature at which carbon deposition goes beyond a tolerable range in the case where only the raw material is supplied to the reformer 111. At step ST3, water begins to be supplied to the reformer 111 in order to prevent deposition of carbon. Note that "carbon deposition going beyond a tolerable range" may refer to a temperature at which carbon deposition begins to be observed, or a temperature at which carbon deposition reaches a certain amount after it begins to be observed.

Next, at step ST4, when the reforming temperature detector 117 approaches a reforming reaction reference temperature (temperature II shown in FIG. 5(a); typically 350° C.), the heating section 116 is controlled so that the temperature of the reforming catalyst does not exceed the reforming reaction reference temperature. Specifically, by subduing the operation of the heating section 116, the increase in the temperature of the reforming catalyst is suppressed as shown in FIG. 5(a). The reforming reaction reference temperature is a temperature of the reforming catalyst such that the carbon dioxide concentration in the hydrogen-containing gas that is discharged from the reformer 111 is equal to or less than a reference level. As described above, when condensed water exists in the shift converter 121, the characteristics of the shift catalyst become more deteriorated as the amount of carbon dioxide supplied to the shift converter 121 increases. Therefore, at step ST4, by keeping the amount of carbon dioxide supplied from the reformer 111 to the shift converter 121 at a reference level or less, deterioration in the characteristics of the shift catalyst is suppressed. Note that this reference level may be set based on an empirical value at which the deterioration in the characteristics of the shift catalyst would go beyond a tolerable range, for example.

Next, at step ST5, when the shift temperature detector 123 detects a shift reference temperature (temperature III shown in FIG. 5(b); typically 100° C.), the amount of heating by the heating section 116 is increased so as to further increase the temperature of the reforming catalyst. As a result, as shown in FIG. 5(a), the temperature detected by the reforming temperature detector 117 is further increased. The shift reference temperature is a temperature such that water condensation at the shift converter 121 falls within a tolerable range. Since deterioration in the characteristics of the shift catalyst occurs in the case where water has condensed in the shift converter 121, presumably, deterioration in the characteristics of the shift catalyst is unlikely to occur even if a large amount of carbon dioxide is supplied into the shift converter 121 having a higher temperature than the shift reference temperature.

On the other hand, when the shift temperature detector 123 detects the shift reference temperature, S/C is also increased as shown in FIG. 5(c). The reason is that, once the shift reference temperature is reached, water condensation is unlikely to occur in the shift converter 121; therefore, even if S/C is increased so as to increase the amount of water to be supplied to the shift converter 121, deterioration of the shift catalyst due to water condensation is unlikely to occur. Moreover, by increasing S/C at this point in time, the amount of gas moving from the reformer 111 to the shift converter 121 increases, whereby heating of the shift converter 121 is also promoted.

Thereafter, the boot of the fuel processing apparatus is completed when: the temperature detected by the reforming temperature detector 117 reaches a temperature which is suitable for reforming reaction (typically 650° C.); the temperature detected by the shift temperature detector 123 reaches a temperature suitable for shift reaction (typically 200 to 250° C.); and the temperature of the CO remover 131 reaches a temperature suitable for selective oxidation reaction (typically 100 to 250° C.).

After the boot of the fuel processing apparatus is completed, a normal driving operation is conducted. During the normal driving operation, temperature adjustment is made by utilizing radiation with an air cooling fan, residual heat in the heating section 112, or an electric heater, etc. (not shown in detail).

In the above description, a manner of performing a boot by heating the reformer 111 and the shift converter 121 from room temperature was described. However, in the case where the fuel cell is frequently switched ON or OFF, after power is terminated, another boot may be started even before the temperature of the fuel processing apparatus 100 lowers to room temperature. If the temperature of the shift converter 121 is a sufficiently high temperature, an operation under conditions similar to normal driving may be conducted since the beginning of the boot, because problems will not occur even if moisture and carbon dioxide are supplied in large amounts. Hereinafter, a manner of deciding whether to perform the operation which is specific to booting or an operation similar to normal driving, by determining whether the temperature of the shift converter 121 is equal or higher than the shift reference temperature or not, will be described.

Figure 6:
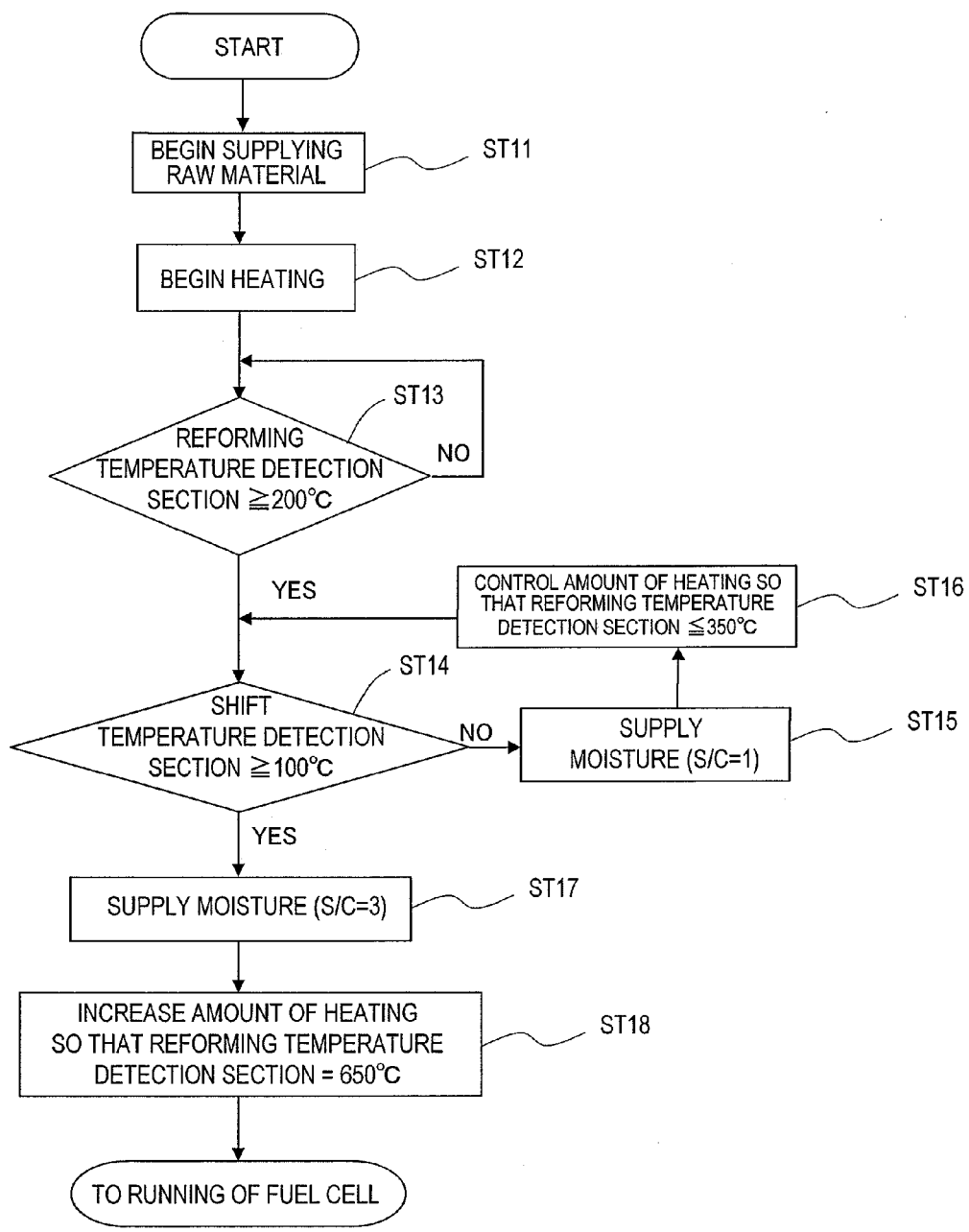
FIG. 6 A flowchart showing a boot operation of the fuel processing apparatus of Embodiment 1 in more detail.
Figure 7:
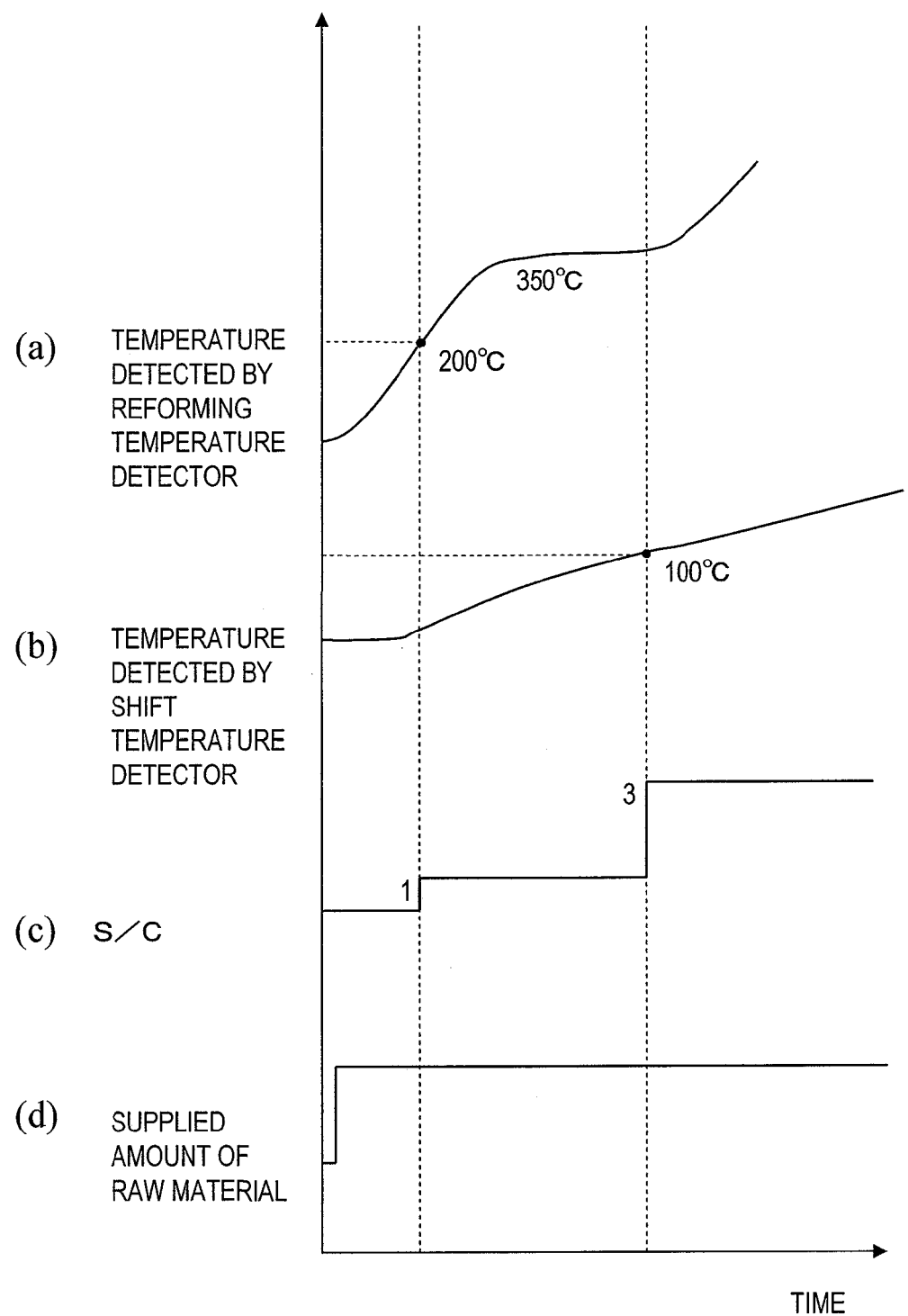
FIG. 7 A timing chart showing temperature of a reforming catalyst, temperature of a shift catalyst, S/C, and supplied amount of raw material.

FIG. 6 is a flowchart showing the boot operation of the fuel processing apparatus of Embodiment 1 in more detail. FIG. 7 is a timing chart showing temperature of a reforming catalyst, temperature of a shift catalyst, S/C, and supplied amount of raw material. Note that FIG. 7 illustrates a case where the reformer 111 and the shift converter 121 are heated from room temperature.

As shown in FIG. 6, first, at step ST11, the operation of the raw material supply section 112 is controlled so as to begin supplying the raw material gas from the raw material supply path 113 to the reformer 111. After passing through the shift converter 121 and the CO remover 131, the raw material gas is supplied to the heating section 116 via the pipes 145 and 141. At the heating section 116, as shown in step ST12, heating is begun by combusting the raw material gas. As a result, as shown in FIG. 7(a), the temperature of the reformer 111 begins to increase.

Next, at step ST13, it is determined whether or not the temperature detected by the reforming temperature detector 117 is equal to or greater than 200° C., which is the previously-set reforming water supply reference temperature. If the temperature detected by the reforming temperature detector 117 is less than 200° C., a further heating of the reformer 111 is performed, after which the determination of step ST13 is made again.

On the other hand, in the determination of step ST13, if the temperature detected by the reforming temperature detector 117 reaches 200° C., control proceeds to step ST14 to determine whether or not the temperature detected by the shift temperature detection section 123 is equal to or greater than 100° C. Generally speaking, when both the reformer 111 and the shift converter 121 are heated from room temperature, the temperature detected by the shift temperature detector 123 will reach 100° C. later than the temperature detected by the reforming temperature detector 117 reaches 200° C. As a result, the result of determination of step ST14 will presumably be No. On the other hand, after the fuel processing apparatus is once stopped, if the fuel processing apparatus is again run before the temperatures of the reformer 111 and the shift converter 121 lower to room temperature, the heat from the previous run will still remain in the shift converter 121. As a result, the result of determination of step ST14 may be Yes in some cases.

If the result of determination of step ST14 is No, first, as shown at step ST15 and in FIG. 7(c), an amount of moisture equivalent to an S/C of 1 begins to be supplied. Then, as shown at step ST16 and in FIG. 7(a), the heating section 116 is controlled so that the temperature detected by the reforming temperature detector 117 is 350° C. or less. Such control is continued until the temperature detected by the shift temperature detection section reaches 100° C., i.e., until the result of determination of step ST14 becomes Yes.

On the other hand, if the result of determination of step ST14 becomes Yes, control proceeds to step ST17, and an amount of moisture equivalent to an S/C of 3 is supplied, as in the normal driving operation state. Furthermore, at step ST18, the raw material supply section 112 or the heating section 116 is controlled so that the temperature detected by the reforming temperature detector 117 is 650° C.

In the booting method of the present embodiment, when the temperature of the reforming catalyst reaches the reforming water supply reference temperature (200° C.), not only the raw material but also water is supplied to the reformer 111. This makes it possible to prevent deposition of carbon due to pyrolysis of the raw material or the like in the reformer 111. Moreover, since the gas flow rate of the hydrogen-containing gas from the reformer 111 is increased over the case where only the raw material is supplied to the reformer 111, the heat quantity to be supplied to the shift converter 121 and the CO remover 131 is increased. As a result, the boot time of the fuel processing apparatus 100 can be shortened.

Moreover, after the reforming catalyst reaches the reforming reaction reference temperature (350° C.) and until the shift catalyst reaches the shift reference temperature (100° C.), the heating section 116 is controlled so that the temperature of the reforming catalyst does not exceed the reforming reaction reference temperature. Since this makes it possible to keep the amount of carbon dioxide generated in the reformer 111 small when there is a fear of water condensation in the shift converter 121, deterioration of the shift catalyst can be suppressed.

Furthermore, after the temperature of the shift catalyst reaches the shift reference temperature, the value of S/C is increased so as to increase the amount of water to be supplied to the reformer 111 and the shift converter 121. In other words, when the temperature of the shift catalyst is lower than the shift reference temperature so that water may condense on the shift catalyst, a smaller amount of water is supplied than the water which is supplied during the normal driving. Since this makes it possible to reduce the amount of carbon dioxide generated by the reformer 111 and also reduce the amount of water condensing at the shift converter 121, deterioration in the characteristics of the shift catalyst can be suppressed. On the other hand, if the temperature of the shift catalyst becomes equal to or greater than the shift reference temperature, the same amount of water as that in the normal driving is supplied, so that the gas flow rate of the hydrogen-containing gas from the reformer 111 increases. This makes it possible to increase the heat quantity to be supplied to the shift converter 121 and the CO remover 131, and shorten the boot time of the fuel processing apparatus 100.

In the present embodiment, when the temperature of the reforming catalyst reaches the reforming water supply reference temperature (200° C.), an amount of water equivalent to an S/C of 1 is supplied; when the temperature of the reforming catalyst reaches the reforming reaction reference temperature (350° C.), increase in the temperature of the reforming catalyst is suppressed; and when the temperature of the shift catalyst reaches the shift reference temperature (100° C.), the temperature of the reforming catalyst is increased and also an amount of water equivalent to an S/C of 3 is supplied. However, these temperature and S/C values may be determined in consideration of the amount of $CO_2$ that is generated in the reformer 111 when the fuel processing apparatus is booted. For example, the reforming water supply reference temperature is not limited to 200° C. Moreover, the temperature at which carbon deposits will depend on the type of reforming catalyst; for example, the reforming water supply reference temperature needs to be set to a lower temperature for a Ni type catalyst than for a Ru type catalyst. Thus, for each reforming catalyst used, a reforming water supply reference temperature is preferably set by measuring a temperature at which carbon deposits, for example. For example, if a Ru type catalyst is used, there may be cases where carbon deposits when the reforming catalyst is 400° C., thus deteriorating the characteristics. However, carbon deposition can be suppressed by adding a small amount of steam. For example, by adding a steam at a rate of S/C=1, deterioration in the characteristics can be suppressed. However, under the conditions where S/C is small and the catalyst temperature is high, carbon deposition due to disproportionation may also occur. Therefore, the reforming water supply reference temperature is preferably a temperature which prevents carbon deposition due to disproportionation, based on the relationship between the catalyst temperature and the amount of water to be supplied.

Moreover, the reforming reaction reference temperature is preferably set to a temperature which allows as little $CO_2$ to be generated as possible due to a steam reforming reaction at the reforming catalyst. This temperature is preferably a temperature at which the $CO_2$ amount in the hydrogen-containing gas accounts for 10% or less of the carbon component in the raw material. Note that, the generated amount of $CO_2$ may be determined through a comprehensive consideration of the reforming catalyst temperature and S/C, rather than being uniquely determined from the temperature of the reforming catalyst, because it changes as the S/C value changes.

Moreover, the amount of water whose supply is begun after detection of the reforming water supply reference temperature is also preferably an amount such that the $CO_2$ amount in the hydrogen-containing gas accounts for 10% or less of the carbon component in the raw material.

Although the shift reference temperature is illustrated as 100° C. in the present embodiment, it may be any temperature at which water does not condense on the shift catalyst, i.e., any temperature equal to or greater than the dew point.

In the present embodiment, steps are performed so that supply of the raw material is first performed, and then heating with the heating section 116 is begun by using the raw material. However, in the case where fuel is supplied to the heating section 116 via another route, supply of the raw material may be begun after beginning heating with the heating section 116. Moreover, the order between beginning the heating with the heating section 116 and beginning supply of the raw material may be rendered conveniently selectable based on apparatus construction, guaranteed that the subsequent steps can be performed appropriately.

The heating section 116 supplies the heat which is necessary for the reforming reaction. However, it is needless to say that, not only heating the reforming catalyst, the heating section 116 also contributes to the heating of the raw material, water, and steam. Alternatively, the shift converter 121 may be directly heated.

(Embodiment 2)

Next, Embodiment 2 of the present invention will be described. Since the same fuel processing apparatus 100 as that of Embodiment 1 is used as the fuel processing apparatus, descriptions of the construction will be omitted.

<Operation of the Fuel Processing Apparatus 100>

Figure 8:
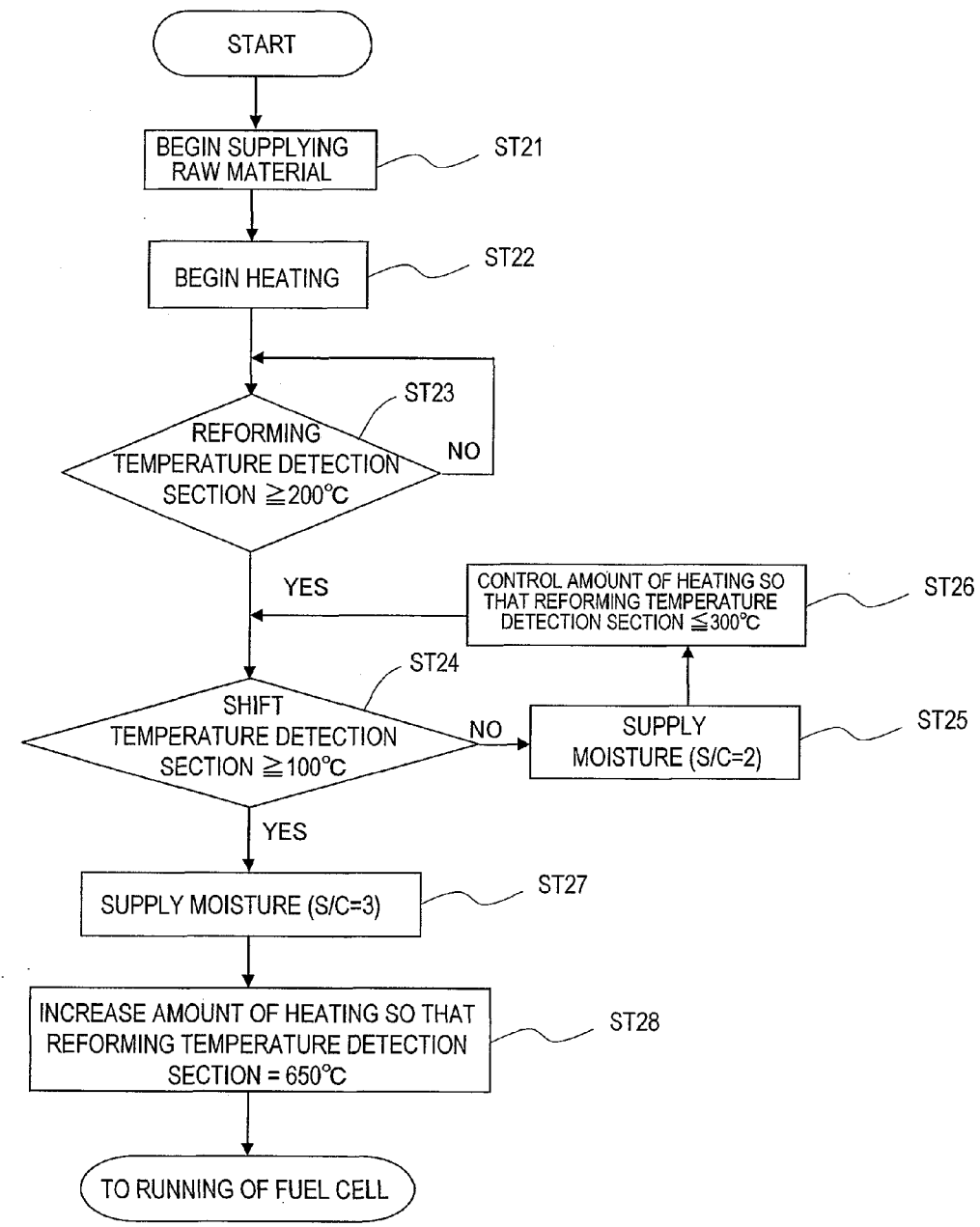
FIG. 8 A flowchart showing a boot operation of a fuel processing apparatus of Embodiment 2.
Figure 9:
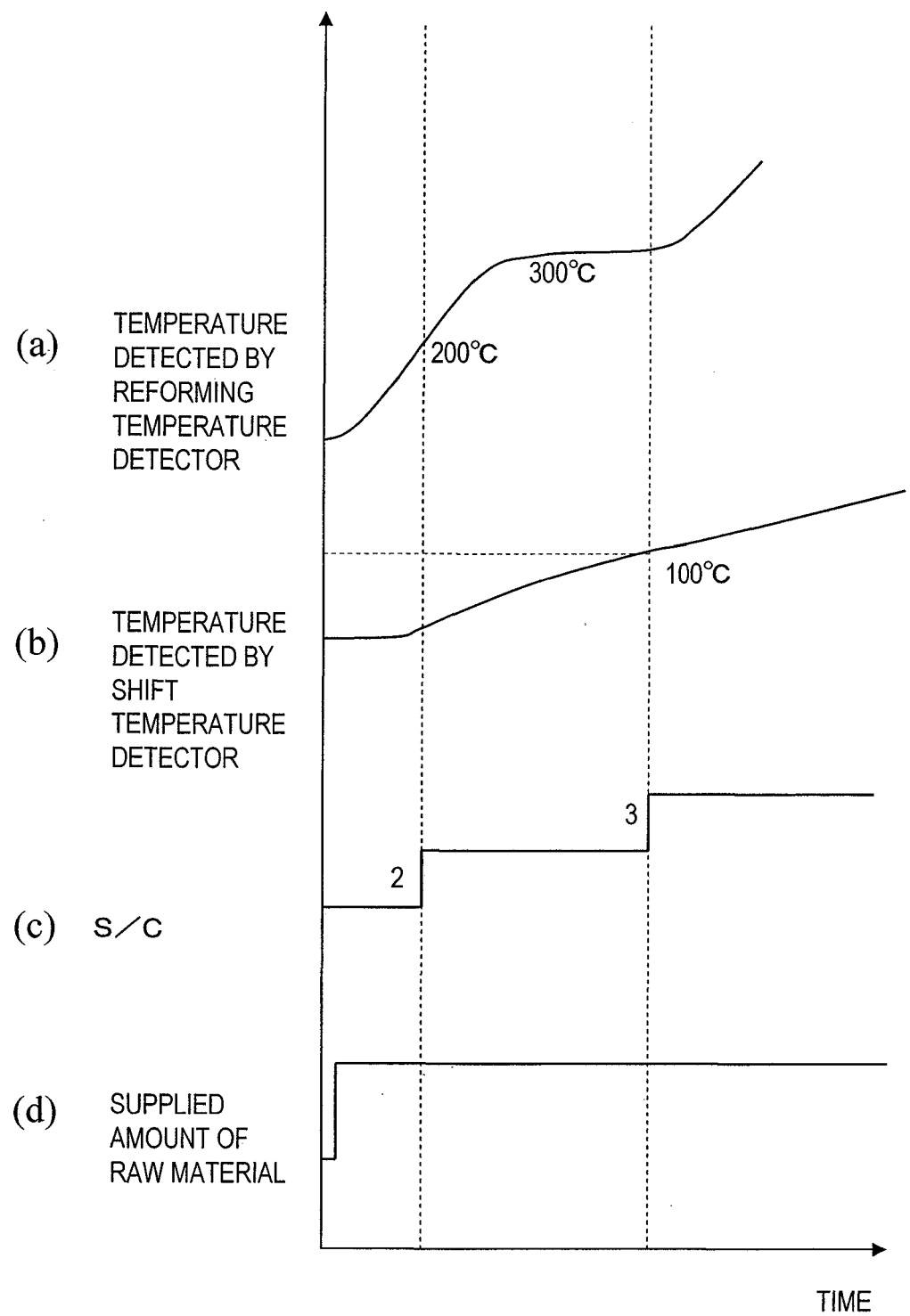
FIG. 9 A timing chart showing temperature of a reforming catalyst, temperature of a shift catalyst, S/C, and supplied amount of raw material.

In the present embodiment, the amount of water is increased and the reforming temperature is lowered relative to Embodiment 1. FIG. 8 is a flowchart showing a boot operation of the fuel processing apparatus of Embodiment 2. FIG. 9 is a timing chart showing temperature of a reforming catalyst, temperature of a shift catalyst, S/C, and supplied amount of raw material. Note that FIG. 9 illustrates the case where the reformer 111 and the shift converter 121 are heated from room temperature.

As shown in FIG. 8, in the present embodiment, when the fuel processing apparatus is booted, at step ST21, the operation of the raw material supply section 112 is first controlled so that the raw material gas begins to be supplied from the raw material supply path 113 to the reformer 111. After passing through the shift converter 121 and the CO remover 131, the raw material gas is supplied to the heating section 116 via the pipes 145 and 141. In the heating section 116, as shown at step ST22, heating is begun by allowing the raw material gas to combust. As a result, as shown in FIG. 9(a), the temperature of the reformer 111 begins to increase.

Next, at step ST23, it is determined whether or not the temperature detected by the reforming temperature detector 117 is equal to or greater than 200° C., which is the previously-set reforming water supply reference temperature. If the temperature detected by the reforming temperature detector 117 is less than 200° C., after further heating the reformer 111, the determination of step ST23 is performed again. On the other hand, at the determination of step ST23, if the temperature detected by the reforming temperature detector 117 exceeds 200° C., control proceeds to step ST24 to determine whether or not the temperature detected by the shift temperature detection section is equal to or greater than 100° C. Generally speaking, when both the reformer 111 and the shift converter 121 are heated from room temperature, the temperature detected by the shift temperature detector 123 will reach 100° C. later than the temperature detected by the reforming temperature detector 117 reaches 200° C. As a result, the result of determination of step ST24 will presumably be No. On the other hand, after the fuel processing apparatus is once stopped, if the fuel processing apparatus is again run before the temperatures of the reformer 111 and the shift converter 121 lower to room temperature, the heat from the previous run will still remain in the shift converter 121. As a result, the result of determination of step ST24 may be Yes in some cases.

If the result of determination of step ST24 is No, first, as shown at step ST25 and in FIG. 9(c), an amount of moisture equivalent to an S/C of 2 begins to be supplied. Then, as shown in at step ST26 and in FIG. 9(a), the heating section 116 is controlled so that the temperature detected by the reforming temperature detector 117 is 300° C. or less. Such control is continued until the temperature detected by the shift temperature detection section reaches 100° C., i.e., until the result of determination of step ST24 becomes Yes.

On the other hand, if the result of determination of step ST24 becomes Yes, control proceeds to step ST27, and an amount of moisture equivalent to an S/C of 3 is supplied, as in the normal driving operation state. Furthermore, at step ST28, the raw material supply section 112 or the heating section 116 is controlled so that the temperature detected by the reforming temperature detector 117 is 650° C. Through the above steps, a boot of the fuel processing apparatus is performed.

In the present embodiment, as compared to Embodiment 1, the amount of water to be supplied when the temperature of the reforming catalyst reaches the reforming water supply reference temperature is increased, but the reforming reaction reference temperature is lowered instead. As a result of this, effects similar to those in Embodiment 1 are obtained.
(Embodiment 3)

Next, Embodiment 3 of the present invention will be described. The present embodiment does not perform a step of reducing the amount of carbon dioxide to be supplied to the shift converter 121 (step ST4 in FIG. 4 or step ST16 in FIG. 6).

Since the same fuel processing apparatus 100 as that of Embodiment 1 is used as the fuel processing apparatus, descriptions of the construction will be omitted.
<Operation of the Fuel Processing Apparatus 100>

Figure 10:
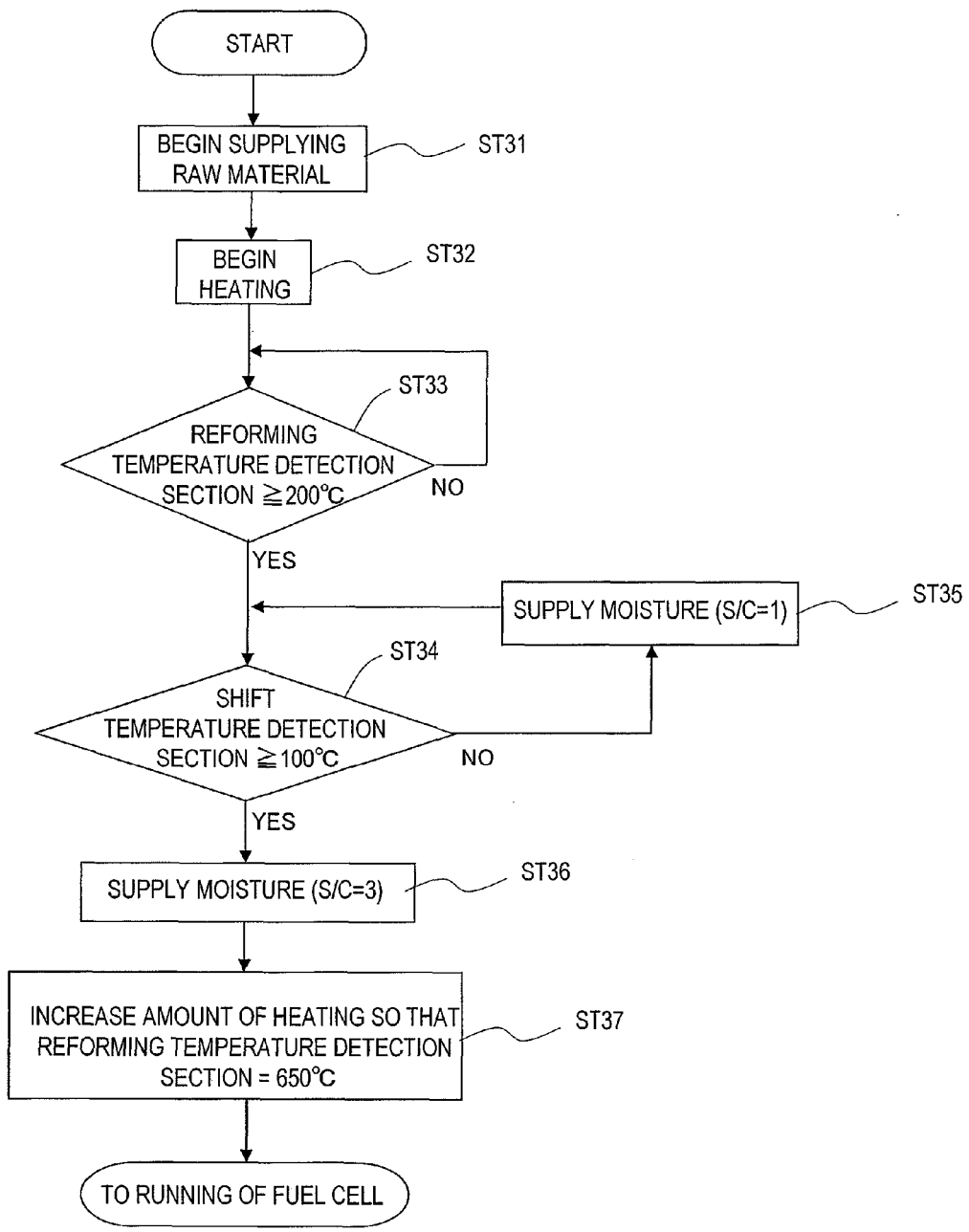
FIG. 10 A flowchart showing a boot operation of a fuel processing apparatus of Embodiment 3.
Figure 11:
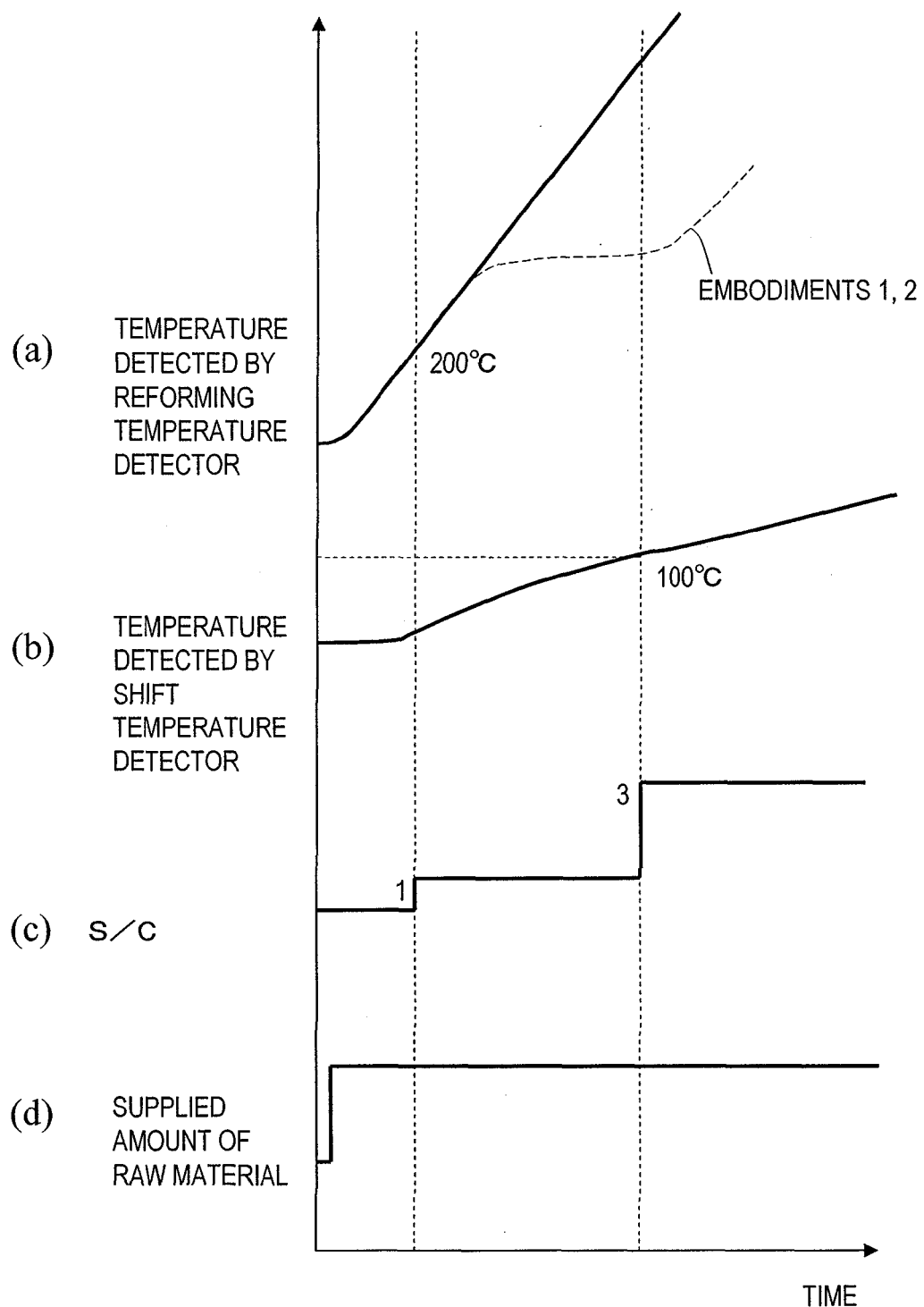
FIG. 11 A timing chart showing temperature of a reforming catalyst, temperature of a shift catalyst, S/C, and supplied amount of raw material.

FIG. 10 is a flowchart showing a boot operation of the fuel processing apparatus of Embodiment 3. FIG. 11 is a chart showing temperature of a reforming catalyst, temperature of a shift catalyst, S/C, and supplied amount of raw material.

As shown in FIG. 10, in the present embodiment, when the fuel processing apparatus is booted, at step ST31, the operation of the raw material supply section 112 is first controlled so that the raw material gas begins to be supplied from the raw material supply path 113 to the reformer 111. After passing through the shift converter 121 and the CO remover 131, the raw material gas is supplied to the heating section 116 via the pipes 145 and 141. In the heating section 116, as shown at step ST32, heating is begun by allowing the raw material gas to combust. As a result, as shown in FIG. 11(a), the temperature of the reformer 111 begins to increase.

Next, at step ST33, it is determined whether or not the temperature detected by the reforming temperature detector 117 is equal to or greater than 200° C., which is the previously-set reforming water supply reference temperature. If the temperature detected by the reforming temperature detector 117 is less than 200° C., after further heating the reformer 111, the determination of step ST3 is performed again. On the other hand, at the determination of step ST33, if the temperature detected by the reforming temperature detector 117 exceeds 200° C., control proceeds to step ST34 to determine whether or not the temperature detected by the shift temperature detection section is equal to or greater than 100° C. Generally speaking, when both the reformer 111 and the shift converter 121 are heated from room temperature, the temperature detected by the shift temperature detector 123 will reach 100° C. later than the temperature detected by the reforming temperature detector 117 reaches 200° C. As a result, the result of determination of step ST34 will presumably be No. On the other hand, after the fuel processing apparatus is once stopped, if the fuel processing apparatus is again run before the temperatures of the reformer 111 and the shift converter 121 lower to room temperature, the heat from the previous run will still remain in the shift converter 121. As a result, the result of determination of step ST34 may be Yes in some cases.

If the result of determination of step ST34 is No, first, as shown at step ST35 and in FIG. 11(c), an amount of moisture equivalent to an S/C of 1 begins to be supplied. Thereafter, in Embodiment 1 and Embodiment 2, heating of the reformer 111 is suppressed when the reforming temperature detector 117 detects the reforming water supply reference temperature; however, no such control is performed in the present embodiment. As a result, as shown in FIG. 11(a), the temperature detected by the reforming temperature detector 117 keeps uniformly increasing.

On the other hand, if the result of determination at step ST34 becomes Yes, control proceeds to step ST36, and an amount of moisture equivalent to an S/C of 3 is supplied so that a normal driving operation state occurs. Furthermore, at step ST37, the raw material supply section 112 or the heating section 116 is controlled so that the temperature detected by the reforming temperature detector 117 is 650° C. Through the above steps, a boot of the fuel processing apparatus is performed.

In the present embodiment, when the temperature of the reforming catalyst reaches the reforming water supply reference temperature (200° C.), not only the raw material but also water is supplied to the reformer 111. This makes it possible to prevent deposition of carbon due to pyrolysis of the raw material or the like in the reformer 111. Moreover, since the gas flow rate of the hydrogen-containing gas from the reformer 111 is increased over the case where only the raw material is supplied to the reformer 111, the heat quantity to be supplied to the shift converter 121 and the CO remover 131 is increased. As a result, the boot time of the fuel processing apparatus 100 can be shortened.

Furthermore, after the temperature of the shift catalyst reaches the shift reference temperature, the value of S/C is increased so as to increase the amount of water to be supplied to the reformer 111 and the shift converter 121. In other words, when the temperature of the shift catalyst is lower than the shift reference temperature so that water may condense on the shift catalyst, a smaller amount of water is supplied than the water which is supplied during the normal driving. Since this makes it possible to reduce the amount of carbon dioxide generated by the reformer 111 and also reduce the amount of water condensing at the shift converter 121, deterioration in the characteristics of the shift catalyst can be suppressed. On the other hand, if the temperature of the shift catalyst becomes equal to or greater than the shift reference temperature, the same amount of water as that in the normal driving is supplied, so that the gas flow rate of the hydrogen-containing gas from the reformer 111 increases. This makes it possible to increase the heat quantity to be supplied to the shift converter 121 and the CO remover 131, and shorten the boot time of the fuel processing apparatus 100.

(Embodiment 4)

Next, Embodiment 4 of the present invention will be described. The present embodiment does not perform a step of increasing S/C after the shift temperature detector 123 detects the shift reference temperature (step ST17 in FIG. 6). A constant amount of moisture is supplied since the beginning of moisture supply.

Since the same fuel processing apparatus 100 as that of Embodiment 1 is used as the fuel processing apparatus, descriptions of the construction will be omitted.

<Operation of the Fuel Processing Apparatus 100>

Figure 12:
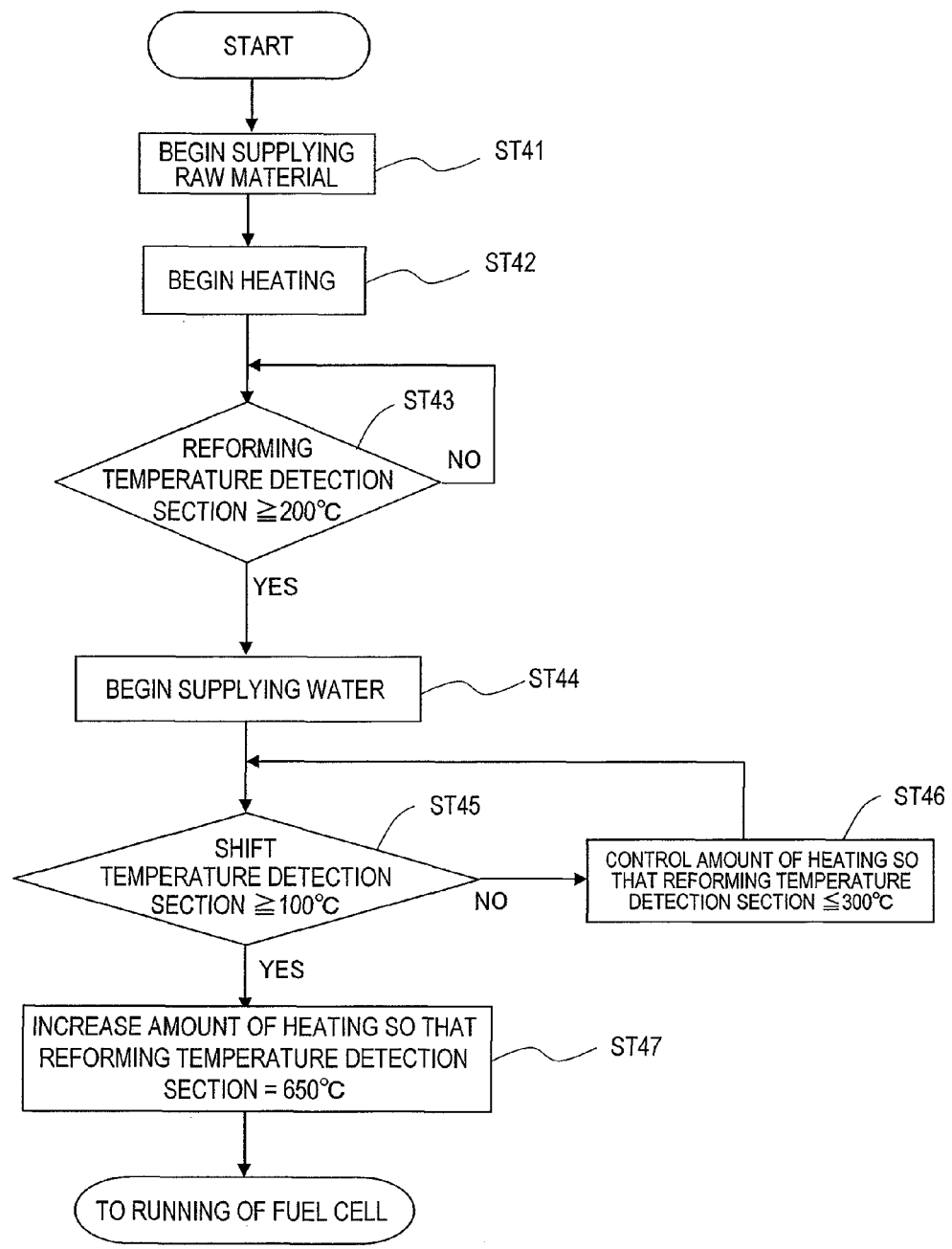
FIG. 12 A flowchart showing a boot operation of a fuel processing apparatus of Embodiment 4.
Figure 13:
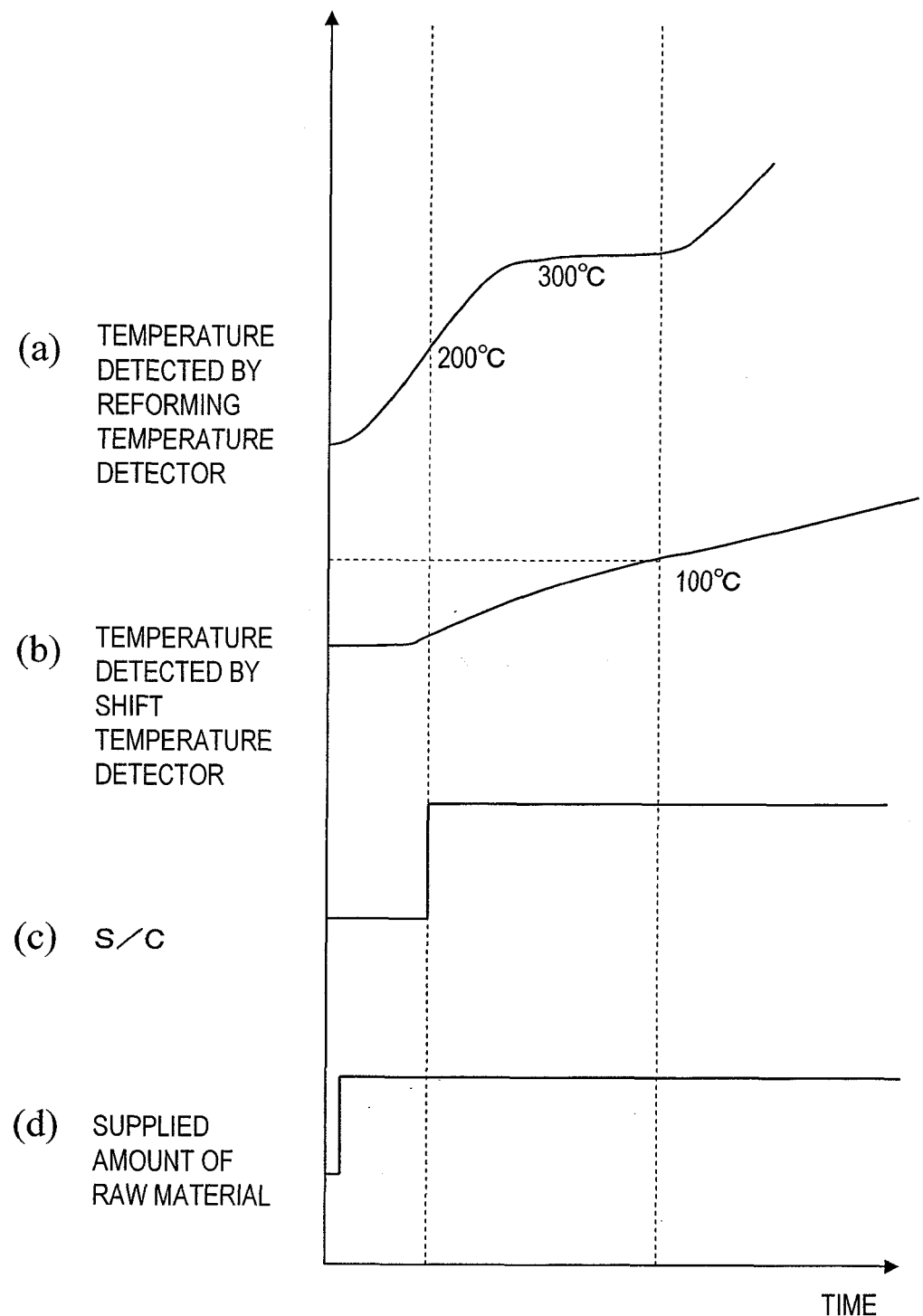
FIG. 13 A timing chart showing temperature of a reforming catalyst, temperature of a shift catalyst, S/C, and supplied amount of raw material.

FIG. 12 is a flowchart showing a boot operation of the fuel processing apparatus of Embodiment 4. FIG. 13 is a timing chart showing temperature of a reforming catalyst, temperature of a shift catalyst, S/C, and supplied amount of raw material. Note that FIG. 13 illustrates the case where the reformer 111 and the shift converter 121 are heated from room temperature.

As shown in FIG. 12, at step ST41, the operation of the raw material supply section 112 is first controlled so that the raw material gas begins to be supplied from the raw material supply path 113 to the reformer 111. After passing through the shift converter 121 and the CO remover 131, the raw material gas is supplied to the heating section 116 via the pipes 145 and 141. In the heating section 116, as shown at step ST42, heating is begun by allowing the raw material gas to combust. As a result, as shown in FIG. 13(a), the temperature of the reformer 111 begins to increase.

Next, at step ST43, it is determined whether or not the temperature detected by the reforming temperature detector 117 is equal to or greater than 200° C., which is the previously-set reforming water supply reference temperature. If the temperature detected by the reforming temperature detector 117 is less than 200° C., after further heating the reformer 111, the determination of step ST43 is performed again. On the other hand, in the determination of step ST43, if the temperature detected by the reforming temperature detector 117 exceeds 200° C., control proceeds to step ST44, and an amount of moisture equivalent to an S/C of 3 begins to be supplied, for example.

Thereafter, control proceeds to step ST45, and it is determined whether or not the temperature detected by the shift temperature detection section 123 is equal to or greater than 100° C. Generally speaking, when both the reformer 111 and the shift converter 121 are heated from room temperature, the temperature detected by the shift temperature detector 123 will reach 100° C. later than the temperature detected by the reforming temperature detector 117 reaches 200° C. As a result, the result of determination of step ST45 will presumably be No. On the other hand, after the fuel processing apparatus is once stopped, if the fuel processing apparatus is again run before the temperatures of the reformer 111 and the shift converter 121 lower to room temperature, the heat from the previous run will still remain in the shift converter 121. As a result, the result of determination of step ST45 may be Yes in some cases.

If the result of determination of step ST45 is No, control proceeds to step ST46. At step ST46, as shown in FIG. 13(a), the heating section 116 is controlled so that the temperature detected by the reforming temperature detector 117 is 300° C. or less. Such control is continued until the temperature detected by the shift temperature detection section reaches 100° C., i.e., until the result of determination of step ST45 becomes Yes.

On the other hand, if the result of determination step ST45 becomes Yes, at step ST47, the raw material supply section 112 or the heating section 116 is controlled so that the temperature detected by the reforming temperature detector 117 is 650° C.

In the booting method of the present embodiment, after the reforming catalyst reaches the reforming reaction reference temperature (300° C.) and until the shift catalyst reaches the shift reference temperature (100° C.), the heating section 116 is controlled so that the temperature of the reforming catalyst does not exceed the reforming reaction reference temperature. Since this makes it possible to keep the amount of carbon dioxide generated in the reformer 111 small when there is a fear of water condensation in the shift converter 121, deterioration of the shift catalyst can be suppressed.

Moreover, when the temperature of the reforming catalyst reaches the reforming water supply reference temperature (200° C.), not only the raw material but also water is supplied to the reformer 111. This makes it possible to prevent deposition of carbon due to pyrolysis of the raw material or the like in the reformer 111. Moreover, since the gas flow rate of the hydrogen-containing gas from the reformer 111 is increased over the case where only the raw material is supplied to the reformer 111, the heat quantity to be supplied to the shift converter 121 and the CO remover 131 is increased. As a result, the boot time of the fuel processing apparatus 100 can be shortened.

Although water supply is begun after the reforming temperature detection section 117 detects the reforming water supply temperature (step ST43) in Embodiment 4, water supply may be begun at any arbitrary temperature. For example, water supply may be begun while the temperature detected by the reforming temperature detection section 117 is still lower than the reforming water supply temperature. In this case, water may condense at the shift converter 121. However, after the reforming catalyst reaches the reforming reaction reference temperature, the temperature of the reforming catalyst is controlled so as to not to increase until the shift catalyst reaches the shift reference temperature, and therefore the amount of carbon dioxide supplied to the shift converter 121 is smaller than conventionally. Thus, deterioration of the shift catalyst is more suppressed than conventionally. Note that water supply may be begun a certain amount of time after the reforming temperature detection section 117 detects the reforming water supply temperature.

Industrial Applicability

The present invention is useful for a fuel processing apparatus in which deteriorations of catalysts used in the fuel processing apparatus need to be prevented when stopping of a boot and in which reduction of the boot time is needed, as well as a booting method thereof.

The invention claimed is:

1. A fuel processing apparatus comprising:
a reformer having a reforming catalyst for causing a reforming reaction between a raw material and moisture to generate a hydrogen-containing gas;
a raw material supply section for supplying the raw material to the reformer;
a moisture supply section for supplying the moisture to the reformer;
a heating section for supplying a heat which is necessary for the reforming reaction to at least the reforming catalyst;
a reforming temperature detection section provided for the reformer to detect a temperature of the reforming catalyst;
a shift converter being connected to the reformer and having a shift catalyst for causing a shift reaction between moisture and CO in the hydrogen-containing gas;
a shift temperature detection section provided for the shift converter to detect a temperature of the shift catalyst; and
a control section, wherein,
when the apparatus is booted, the control section
activates the raw material supply section to begin supplying the raw material to the reformer, and activates the heating section to begin supplying the heat to the reforming catalyst, and thereafter,
when the reforming temperature detection section detects a temperature equal to or greater than a reforming water supply reference temperature, operates the moisture supply section to supply the moisture to the reformer, and
while the reforming temperature detection section detects a temperature equal to or greater than the reforming water supply reference temperature, detects an amount of the moisture to be supplied to the reformer and controls the moisture supply section, based on the temperature detected by the shift temperature detection section.

2. The fuel processing apparatus of claim 1, wherein the reforming water supply reference temperature is a temperature of the reforming catalyst such that carbon deposition at the reforming catalyst goes beyond a predetermined range.

3. The fuel processing apparatus of claim 1, wherein,
when the temperature detected by the shift temperature detection section reaches a shift reference temperature, the control section controls the moisture supply section to increase the amount of moisture to be supplied to the reformer; and
the shift reference temperature is a temperature of the shift catalyst such that condensation of water at the shift catalyst falls within a predetermined range.

4. The fuel processing apparatus of claim 3, wherein,
before beginning to supply the moisture, the control section determines whether the temperature detected by the shift temperature detection section has reached the shift reference temperature or not;
if it is determined that the temperature detected by the shift temperature detection section has not reached the shift reference temperature, the control section controls the moisture supply section to supply a first amount of moisture to the reformer until the temperature detected by the shift temperature detection section reaches the shift reference temperature, and supply a second amount of moisture which is greater than the first amount to the reformer when the temperature detected by the shift temperature detection section reaches the shift reference temperature; and
if it is determined that the temperature detected by the shift temperature detection section has reached the shift reference temperature, the control section controls the moisture supply section to supply the second amount of moisture to the reformer since the beginning of supply of the moisture.

5. A fuel processing apparatus comprising:
a reformer having a reforming catalyst for causing a reforming reaction between a raw material and moisture to generate a hydrogen-containing gas;
a raw material supply section for supplying the raw material to the reformer;
a moisture supply section for supplying the moisture to the reformer;
a heating section for supplying a heat which is necessary for the reforming reaction to at least the reforming catalyst;
a reforming temperature detection section provided for the reformer to detect a temperature of the reforming catalyst;
a shift converter being connected to the reformer and having a shift catalyst for causing a shift reaction between moisture and carbon monoxide in the hydrogen-containing gas;
a shift temperature detection section provided for the shift converter to detect a temperature of the shift catalyst; and
a control section, wherein,
when the apparatus is booted, the control section
activates the raw material supply section to begin supplying the raw material to the reformer, and activates the heating section to begin supplying the heat to the reforming catalyst, and thereafter,
operates the moisture supply section to begin supplying the moisture to the reformer, and
until the temperature detected by the shift temperature detection section reaches a shift reference temperature, controls the heating section so that the temperature detected by the reforming temperature detection section is equal to or less than a reforming reaction reference temperature; and
the shift reference temperature is a temperature of the shift catalyst such that condensation of water at the shift temperature detection section falls within a predetermined range, and the reforming reaction reference temperature is a temperature of the reforming catalyst such that a carbon dioxide concentration in the hydrogen-containing gas discharged from the reformer is equal to or less than a reference level.

6. The fuel processing apparatus of claim 5, wherein, if the temperature detected by the shift temperature detection section reaches the shift reference temperature, the control section controls the heating section so that the temperature detected by the reforming temperature detection section is a reforming operation temperature which is higher than the reforming reaction reference temperature.

7. The fuel processing apparatus of claim 5, wherein,
if the temperature detected by the reforming temperature detection section becomes equal to or greater than the reforming water supply reference temperature, the control section causes the reformer to begin supplying moisture; and the reforming water supply reference temperature is a temperature such that carbon deposition at the reforming catalyst goes beyond a predetermined range.

8. The fuel processing apparatus of claim 1, wherein the reforming catalyst contains Ni.

9. The fuel processing apparatus of claim 1, wherein the shift catalyst contains Cu and Zn.

10. A booting method for a fuel processing apparatus including:
  a reformer having a reforming catalyst for causing a reforming reaction between a raw material and moisture to generate a hydrogen-containing gas;
  a raw material supply section for supplying the raw material to the reformer;
  a moisture supply section for supplying the moisture to the reformer;
  a heating section for supplying a heat which is necessary for the reforming reaction to at least the reforming catalyst;
  a reforming temperature detection section provided for the reformer to detect a temperature of the reforming catalyst;
  a shift converter being connected to the reformer and having a shift catalyst for causing a shift reaction between moisture and carbon monoxide in the hydrogen-containing gas; and
  a shift temperature detection section provided for the shift converter to detect a temperature of the shift catalyst, the booting method comprising:
  step (a) of activating the raw material supply section to begin supplying the raw material to the reformer;
  step (b) of activating the heating section to begin supplying the heat to the reforming catalyst;
  step (c) of, after step (a) and step (b), if the reforming temperature detection section detects a temperature equal to or greater than a reforming water supply reference temperature, operating the moisture supply section to supply moisture to the reformer, wherein,
  at step (c), based on the temperature detected by the shift temperature detection section, an amount of moisture to be supplied to the reformer is determined, and the moisture supply section is controlled.

11. The fuel processing apparatus of claim 10, wherein the reforming water supply reference temperature is a temperature of the reforming catalyst such that carbon deposition at the reforming catalyst goes beyond a predetermined range.

12. The booting method for a fuel processing apparatus of claim 10, wherein,
  at step (c), if the temperature detected by the shift temperature detection section reaches the shift reference temperature, the amount of moisture to be supplied to the reformer is increased, and
  the shift reference temperature is a temperature of the shift catalyst such that condensation of water at the shift temperature detection section falls within a predetermined range.

13. The booting method for a fuel processing apparatus of claim 12, further comprising, before step (c), step (d) of determining whether the temperature detected by the shift temperature detection section has reached the shift reference temperature or not, wherein,
  if it is determined at step (d) that the temperature detected by the shift temperature detection section has not reached the shift reference temperature, the moisture supply section is controlled to begin supplying a first amount of moisture to the reformer at step (c) and supply a second amount of moisture which is greater than the first amount to the reformer when the temperature detected by the shift temperature detection section reaches the shift reference temperature; and
  if it is determined at step (d) that the temperature detected by the shift temperature detection section has reached the shift reference temperature, the moisture supply section is controlled to begin supplying the second amount of moisture to the reformer at step (c).

14. A booting method for a fuel processing apparatus including:
  a reformer having a reforming catalyst for causing a reforming reaction between a raw material and moisture to generate a hydrogen-containing gas;
  a raw material supply section for supplying the raw material to the reformer;
  a moisture supply section for supplying the moisture to the reformer;
  a heating section for supplying a heat which is necessary for the reforming reaction to at least the reforming catalyst;
  a reforming temperature detection section provided for the reformer to detect a temperature of the reforming catalyst;
  a shift converter being connected to the reformer and having a shift catalyst for causing a shift reaction between moisture and carbon monoxide in the hydrogen-containing gas; and
  a shift temperature detection section provided for the shift converter to detect a temperature of the shift catalyst, the booting method comprising:
  step (a) of activating the raw material supply section to begin supplying the raw material to the reformer;
  step (b) of activating the heating section to begin supplying the heat to the reforming catalyst;
  step (c) of, after step (a) and step (b), operating the moisture supply section to begin supplying the moisture to the reformer; and
  after step (c), controlling the heating section so that the temperature detected by the reforming temperature detection section is equal to or less than a reforming reaction reference temperature until the temperature detected by the shift temperature detection section reaches a shift reference temperature, wherein,
  the shift reference temperature is a temperature of the shift catalyst such that condensation of water at the shift temperature detection section goes beyond a predetermined range; and
  the reforming reaction reference temperature is a temperature of the reforming catalyst such that a carbon dioxide concentration in the hydrogen-containing gas discharged from the reformer is equal to or less than a reference level.

15. The booting method for a fuel processing apparatus of claim 14, wherein, after step (c), the heating section is controlled so that the temperature detected by the reforming temperature detection section is a reforming operation temperature which is higher than the reforming reaction reference temperature if the temperature detected by the shift temperature detection section reaches the shift reference temperature.

16. The booting method for a fuel processing apparatus of claim 14, wherein,
  at step (c), if the temperature detected by the reforming temperature detection section becomes equal to or greater than the reforming water supply reference temperature, the reformer is caused to begin supplying moisture; and the reforming water supply reference temperature is a temperature of the reforming catalyst such that carbon deposition at the reforming catalyst goes beyond a predetermined range.

17. The fuel processing apparatus of claim 5, wherein the reforming catalyst contains Ni.

18. The fuel processing apparatus of claim 5, wherein the shift catalyst contains Cu and Zn.

* * * * *